(12) United States Patent
Tatsumi

(10) Patent No.: US 7,354,126 B2
(45) Date of Patent: Apr. 8, 2008

(54) IMAGE FORMING APPARATUS, IMAGE FORMING METHOD, AND IMAGE FORMING PROGRAM

(75) Inventor: Daisuke Tatsumi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 389 days.

(21) Appl. No.: 11/223,698

(22) Filed: Sep. 9, 2005

(65) Prior Publication Data

US 2006/0214966 A1    Sep. 28, 2006

(30) Foreign Application Priority Data

Mar. 24, 2005    (JP) .............................. 2005-087206

(51) Int. Cl.
*B41J 2/205* (2006.01)
(52) U.S. Cl. .............................. 347/15; 347/14; 347/95
(58) Field of Classification Search .................. 347/14, 347/15, 95
See application file for complete search history.

(56) References Cited

U.S. PATENT DOCUMENTS 6,267,476 B1 *    7/2001    Kato et al. .................. 347/100
6,834,947 B2 *   12/2004    Moriyama et al. ............ 347/96

FOREIGN PATENT DOCUMENTS

| JP | 2002-067296 | 3/2002 |
| JP | 2002-067297 | 3/2002 |
| JP | 2004-122534 | 4/2004 |

* cited by examiner

Primary Examiner—Thinh Nguyen
(74) Attorney, Agent, or Firm—Fildes & Outland, P.C.

(57) ABSTRACT

An image forming apparatus comprises: a recording head that record dots corresponding to pixels of image data by discharging ink droplets from plural nozzles and discharge, in correspondence to the dots, colorless or light-colored aggregating liquid that causes color material in the ink to aggregate; storage device that stores an image data conversion rule for converting the image data per pixel in accordance with the percentage of the amount of the aggregating liquid with respect to the amount of the discharge ink droplets that record the dots, with the image data conversion rule being determined so that differences in one or both of color and concentration when discharging different amounts of the aggregating liquid onto the dots recorded on the basis of the image data after conversion in accordance with the image data conversion rule become smaller with respect to differences in one or both of color and concentration when discharging different amounts of the aggregating liquid onto the dots recorded on the basis of the image data prior to conversion; setting device that sets the percentage of the amount of the aggregating liquid with respect to the amount of the ink droplets discharged in correspondence to the pixels of the image data; converting device that converts the image data on the basis of the image data conversion rule corresponding to the percentage of the amount of the aggregating liquid set by the setting device; and control device that controls the recording head to record dots in accordance with the image data converted by the converting device and controls the recording head to discharge, in correspondence to the dots, the aggregating liquid of which amount corresponds to the amount of the aggregating liquid of the percentage set by the setting device.

12 Claims, 16 Drawing Sheets

| R | G | B |
|---|---|---|
| 255 | 255 | 255 |
| 255 | 255 | 217 |
| 255 | 217 | 255 |
| 255 | 217 | 217 |
| 217 | 255 | 255 |
| 217 | 255 | 217 |
| 217 | 217 | 255 |
| 217 | 217 | 217 |

| K | C | M | Y |
|---|---|---|---|
| 0 | 0 | 0 | 0 |
| 0 | 0 | 0 | 16 |
| 0 | 3 | 29 | 0 |
| 0 | 0 | 23 | 10 |
| 0 | 17 | 0 | 2 |
| 0 | 17 | 0 | 21 |
| 0 | 18 | 20 | 0 |
| 0 | 9 | 13 | 9 |

| R | G | B |
|---|---|---|
| 255 | 255 | 255 |
| 255 | 255 | 217 |
| 255 | 217 | 255 |
| 255 | 217 | 217 |
| 217 | 255 | 255 |
| 217 | 255 | 217 |
| 217 | 217 | 255 |
| 217 | 217 | 217 |

| K | C | M | Y |
|---|---|---|---|
| 0 | 0 | 0 | 0 |
| 0 | 0 | 0 | 13 |
| 0 | 2 | 25 | 0 |
| 0 | 0 | 20 | 9 |
| 0 | 10 | 0 | 0 |
| 0 | 11 | 0 | 17 |
| 0 | 11 | 18 | 0 |
| 0 | 7 | 12 | 7 |

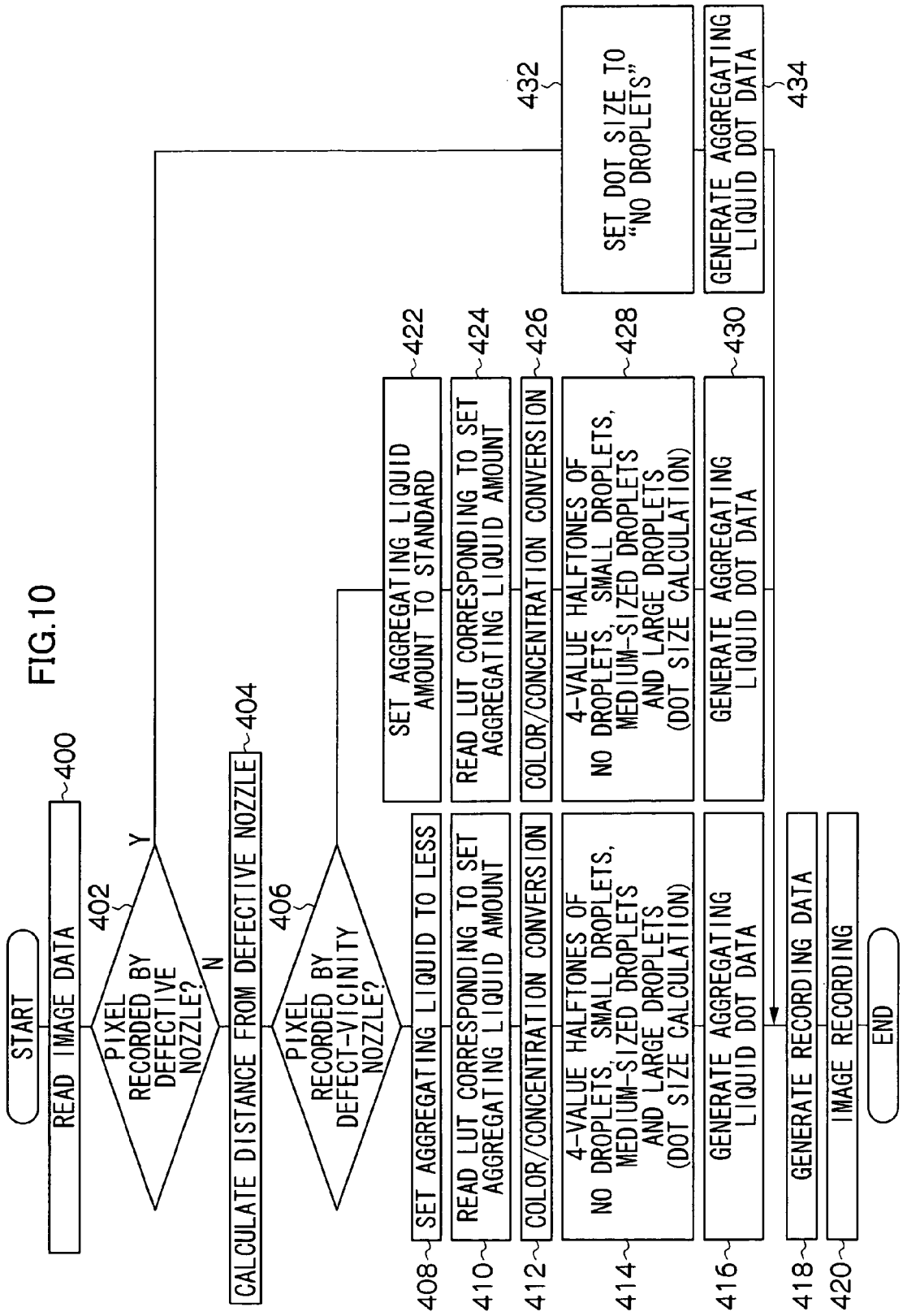

74A 72A 76A 72A 74A 74A 72A 76A 72A 74A 74A 72A 78A 72A 78A 72A 74A 74A 72A 78A 72A 78A 72A 74A

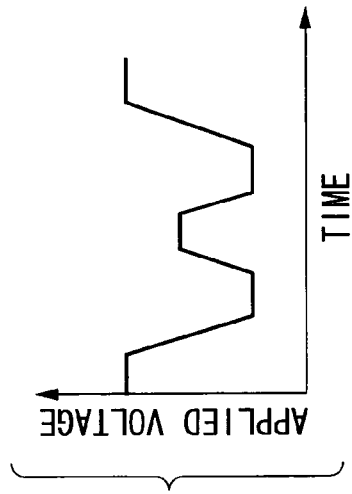
FIG.15A LARGE DROPLETS
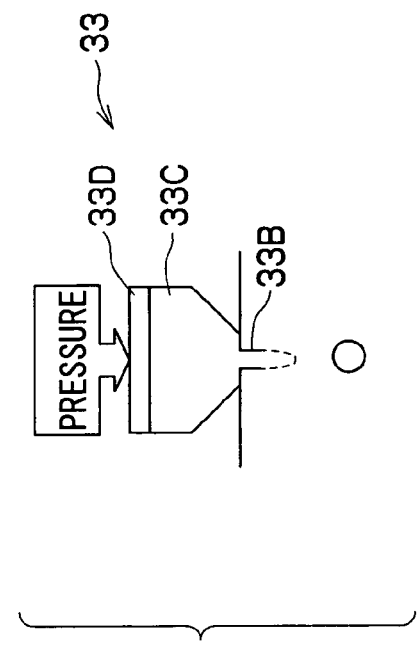
FIG.15B
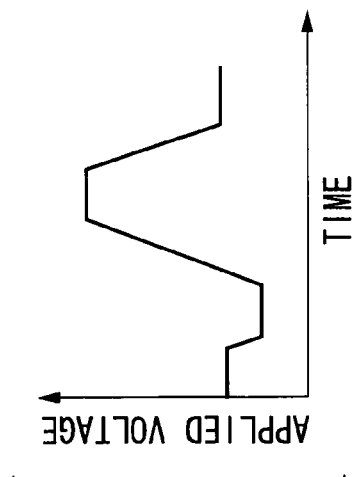
FIG.15C SMALL DROPLETS
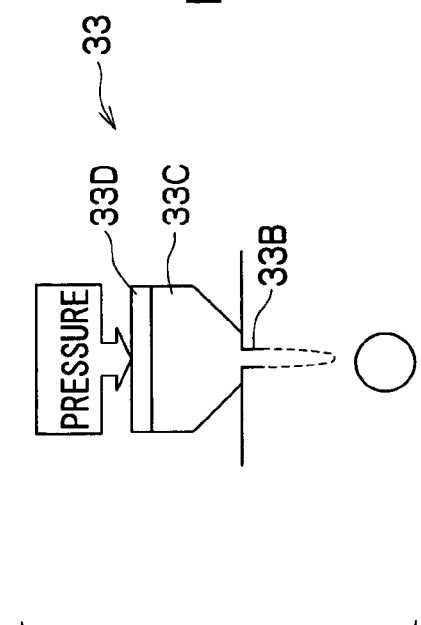
FIG.15D

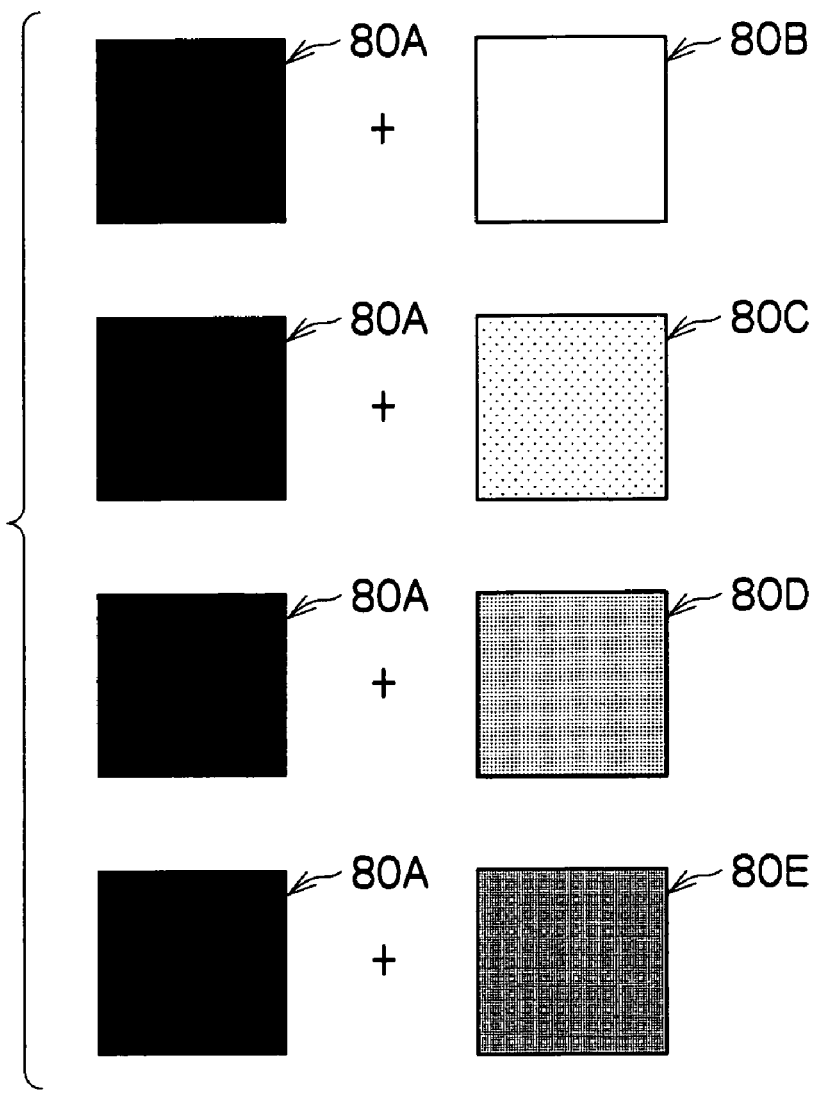

IMAGE FORMING APPARATUS, IMAGE FORMING METHOD, AND IMAGE FORMING PROGRAM

CROSS-REFERENCE TO RELATED APPLICATION

This application claims priority under 35 USC 119 from Japanese Patent Application No. 2005-087206, the disclosure of which is incorporated by reference herein.

BACKGROUND OF THE INVENTION

1. Field of the Invention

The present invention relates to an image forming apparatus, an image forming method, and an image forming program. In particular, the present invention relates to an image forming apparatus, an image forming method, and an image forming program which record an image with recording heads that record dots corresponding to pixels of image data by discharging ink droplets and discharge, in correspondence to the dots, an aggregating liquid that causes color material in the ink to aggregate.

2. Description of the Related Art

Conventionally, image forming apparatus such as inkjet recording apparatus have been known which record dots corresponding to pixels of image data by discharging ink droplets from plural nozzles.

Image forming apparatus have been proposed which, in order to obtain excellent image quality, prevent ink bleeding by discharging an aggregating liquid that causes the color material to aggregate and then discharging the ink droplets over the corresponding dots (e.g., see Japanese Patent Application Laid-Open Publication (JP-A) Nos. 2002-67296, 2002-67297 and 2004-122534).

In the technologies disclosed in JP-A Nos. 2002-67296, 2002-67297 and 2004-122534, the occurrence of stripes resulting from the discharge of ink droplets from defective nozzles, through which it is difficult to discharge ink droplets in a normal discharge amount or in a normal direction, is suppressed. Thus, the aggregating liquid is not discharged to dots recorded by nozzles in the vicinity of the defective nozzles, and the aggregating liquid is discharged to dots recorded by normal nozzles outside the vicinity of the defective nozzles. By configuring the image forming apparatus in this manner, bleeding occurs only in the dots in the vicinity of generated stripes, and the occurrence of stripes can be suppressed.

Also, in order to suppress the occurrence of stripes, the gradation value of the pixels recorded by the nozzles in the vicinity of the defective nozzles is raised and the size of the dots is increased, whereby the occurrence of stripes is suppressed.

However, in these conventional technologies, the aggregating liquid is not discharged to dots recorded by nozzles in the vicinity of the defective nozzles, and the aggregating liquid is discharged to dots recorded by normal nozzles outside the vicinity of the defective nozzles. Thus, regions in which the aggregating liquid has been discharged and regions in which the aggregating liquid has not been discharged occur in the recorded image. When the aggregating liquid is discharged in correspondence to the recorded dots, the ink aggregates due to the effect of the aggregating liquid and the dots become smaller. Thus, there has been the problem that if the aggregating liquid is discharged in different amounts, concentration unevenness and color unevenness occur, which triggers image quality deterioration.

SUMMARY OF THE INVENTION

The present invention has been made in order to address this problem, and provides an image forming apparatus that can suppress image quality deterioration even when the aggregating liquid is discharged in different amounts.

In order to address this problem, a first aspect of the invention provides an image forming apparatus comprising: recording head that record dots corresponding to pixels of image data by discharging ink droplets from plural nozzles and discharge, in correspondence to the dots, colorless or light-colored aggregating liquid that causes color material in the ink to aggregate; a storage means that stores an image data conversion rule for converting the image data per pixel in accordance with the percentage of the amount of the aggregating liquid with respect to the amount of the discharge ink droplets that record the dots, with the image data conversion rule being determined so that differences in one or both of color and concentration when discharging different amounts of the aggregating liquid onto the dots recorded on the basis of the image data after conversion in accordance with the image data conversion rule become smaller with respect to differences in one or both of color and concentration when discharging different amounts of the aggregating liquid onto the dots recorded on the basis of the image data prior to conversion; a setting means that sets the percentage of the amount of the aggregating liquid with respect to the amount of the ink droplets discharged in correspondence to the pixels of the image data; a converting means that converts the image data on the basis of the image data conversion rule corresponding to the percentage of the amount of the aggregating liquid set by the setting means; and a control means that controls the recording head to record dots in accordance with the image data converted by the converting means and controls the recording head to discharge, in correspondence to the dots, the aggregating liquid corresponding to the amount of the aggregating liquid of the percentage set by the setting means.

In a second aspect of the invention, an image forming method is provided which can suppress color unevenness and concentration unevenness even when the amounts of the aggregating liquid are different.

Namely, in this aspect, there is provided an image forming method that records an image corresponding to image data with a recording head that record dots corresponding to pixels of the image data by discharging ink droplets from plural nozzles and discharge, in correspondence to the dots, colorless or light-colored aggregating liquid that causes color material in the ink to aggregate, the method comprising the steps of: storing an image data conversion rule for converting the image data per pixel in accordance with the percentage of the amount of the aggregating liquid with respect to the amount of the discharge ink droplets that record the dots, with the image data conversion rule being determined so that differences in one or both of color and concentration when discharging different amounts of the aggregating liquid onto the dots recorded on the basis of the image data after conversion in accordance with the image data conversion rule become smaller with respect to differences in one or both of color and concentration when discharging different amounts of the aggregating liquid onto the dots recorded on the basis of the image data prior to conversion; setting the percentage of the amount of the aggregating liquid with respect to the amount of the ink droplets discharged in correspondence to the pixels of the image data; converting the image data on the basis of the image data conversion rule corresponding to the set percentage of the amount of the aggregating liquid; and controlling the recording head to record dots in accordance with the converted image data and controlling the recording head to discharge, in correspondence to the dots, the aggregating liquid corresponding to the amount of the aggregating liquid of the percentage set in the setting step.

In a third aspect of the invention, a storage medium storing an image forming program is provided which can suppress color unevenness and concentration unevenness even when the amounts of the aggregating liquid are different, and can suppress image quality deterioration.

Namely, in this aspect, there is provided a storage medium storing an image forming program executed in a computer that controls a recording head that record dots corresponding to pixels of image data by discharging ink droplets from plural nozzles and discharge, in correspondence to the dots, colorless or light-colored aggregating liquid that causes color material in the ink to aggregate, the program comprising the steps of: storing an image data conversion rule for converting the image data per pixel in accordance with the percentage of the amount of the aggregating liquid with respect to the amount of the discharge ink droplets that record the dots, with the image data conversion rule being determined so that differences in one or both of color and concentration when discharging different amounts of the aggregating liquid onto the dots recorded on the basis of the image data after conversion in accordance with the image data conversion rule become smaller with respect to differences in one or both of color and concentration when discharging different amounts of the aggregating liquid onto the dots recorded on the basis of the image data prior to conversion; setting the percentage of the amount of the aggregating liquid with respect to the amount of the ink droplets discharged in correspondence to the pixels of the image data; converting the image data on the basis of the image data conversion rule corresponding to the set percentage of the amount of the aggregating liquid; and controlling the recording head to record dots in accordance with the converted image data and controlling the recording head to discharge, in correspondence to the dots, the aggregating liquid corresponding to the amount of the aggregating liquid of the percentage set in the setting step.

BRIEF DESCRIPTION OF THE DRAWINGS

FIG. 10 is a flow chart showing processing that is executed by a control unit pertaining to a second embodiment of the invention;

FIG. 15A is a schematic diagram showing an applied voltage that is applied to piezoelectric elements when discharging large ink droplets from the nozzles of an inkjet recording head;

FIG. 15B is a schematic diagram showing the configuration of a nozzle of the inkjet recording head, and shows a case where large droplets are discharged from the nozzle;

FIG. 15C is a schematic diagram showing an applied voltage that is applied to piezoelectric elements when discharging small ink droplets from the nozzles of an inkjet recording head;

FIG. 15D is a schematic diagram showing the configuration of a nozzle of the inkjet recording head, and shows a case where small droplets are discharged from the nozzle; and FIG. 16 is a schematic diagram representing varying the percentage of the amount of the aggregating liquid with respect to the ink droplet amount.

DETAILED DESCRIPTION OF THE INVENTION

Embodiments of the invention will be described in detail below with reference to the drawings.

First Embodiment

Figure 1:
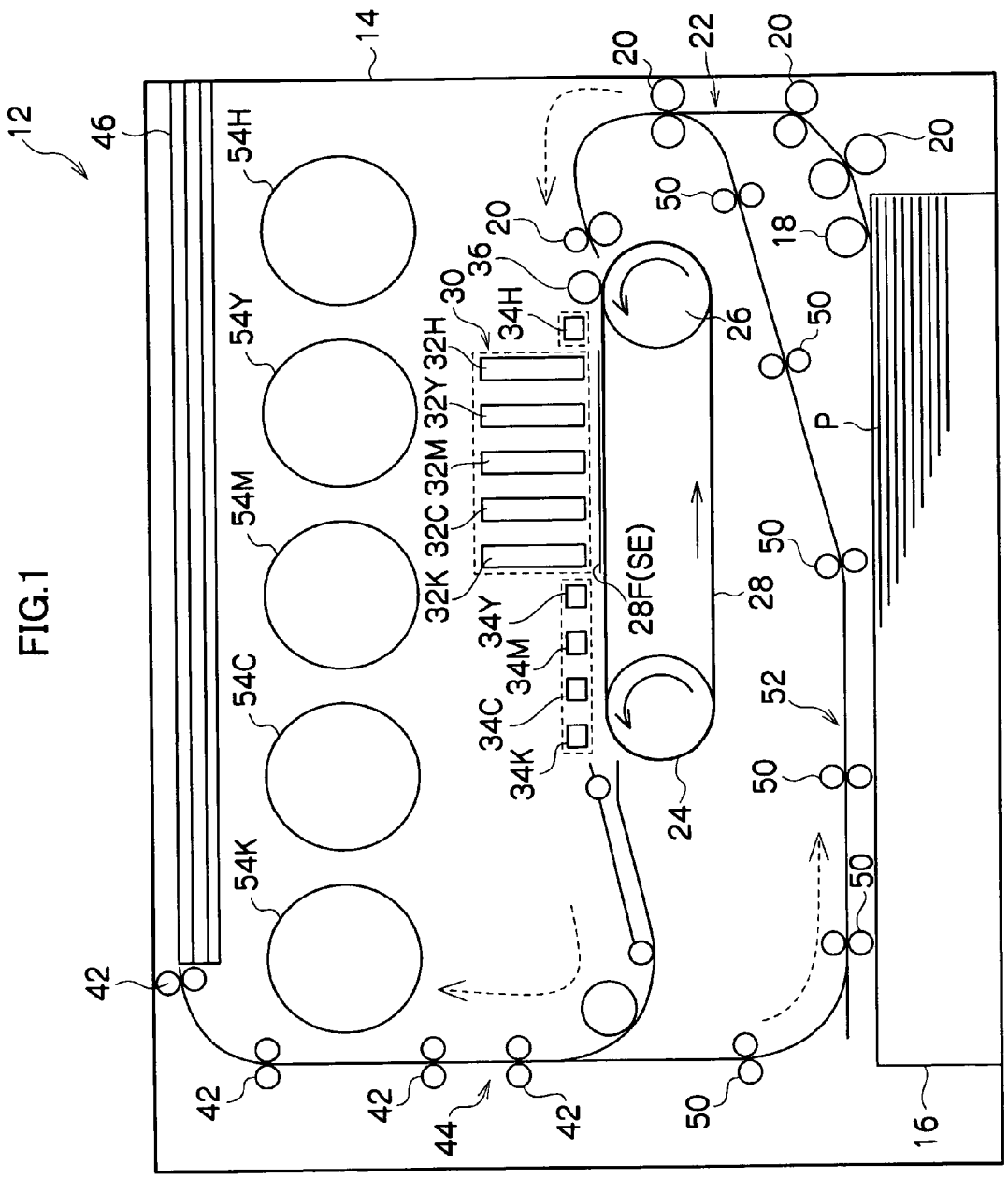
FIG. 1 is a schematic configural diagram of image recording in an inkjet recording apparatus pertaining to the invention.

As shown in FIG. 1, an inkjet recording apparatus 12 serving as the image forming apparatus of the invention includes a casing 14. A paper supply tray 16 is disposed at a lower portion inside the casing 14, and paper P stacked in the paper supply tray 16 is removed one sheet at a time by a pickup roll 18. The removed paper P is conveyed by plural conveyance roller pairs 20 that configure a predetermined conveyance path 22.

Above the paper supply tray 16 is disposed an endless conveyor belt 18 that is stretched around a drive roll 24 and a driven roll 26. A recording head 30 serving as a recording head of the invention is disposed above the conveyor belt 28 and faces a flat portion 28F of the conveyor belt 28. The region of the flat portion 28F facing the recording head 30 serves as a discharge region SE to which ink droplets are discharged from the recording head 30.

The paper P conveyed along the conveyance path 22 is retained at the conveyor belt 28 and reaches the discharge region SE. In a state where the paper P is facing the recording head 30, ink droplets corresponding to image data are discharged from the recording head 30, whereby dots corresponding to pixels of the image data are recorded on the paper P.

It will be noted that multi-pass recording, in which the paper P is passed multiple times through the discharge region SE by causing the paper P to go around in a state where it is retained at the conveyor belt 28, is also possible, but in the present embodiment, an example will be described where an image is recorded in a single pass.

Figure 2:
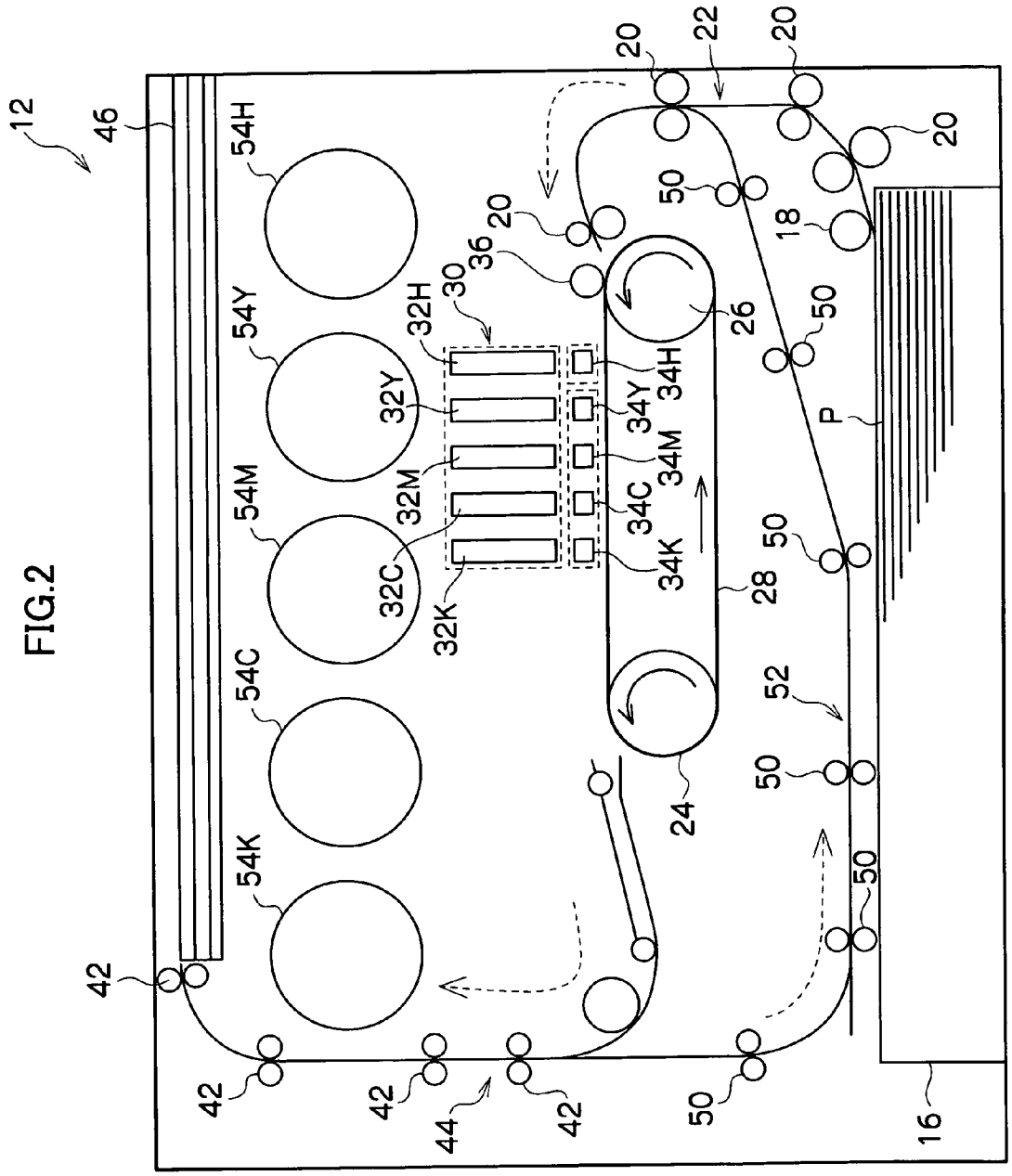
FIG. 2 is a schematic configural diagram of maintenance in the inkjet recording apparatus pertaining to the invention.

In the vicinity of the recording head 30, maintenance units 34 corresponding to inkjet recording heads 32 are disposed. As shown in FIG. 2, when maintenance is conducted with respect to the inkjet recording heads 32, the recording head 30 is moved upward, and the maintenance units 34 move into the space configured between the recording head 30 and the conveyor belt 28. Then, in a state where the maintenance units 34 are facing the nozzle surface of the recording head 30, the maintenance units 34 conduct recovery processing that sucks the ink inside the nozzles.

For the conveyor belt 28, a conveyor belt comprising a semiconductive material (e.g., having a surface resistance of $10^{10}$ to $10^{13}$ $\Omega/m^2$ and a volume resistance of $10^9$ to $10^{12}$ $\Omega/m^2$) being formed to have a thickness of 75 µm, a width of 380 mm and a circumferential length of 1000 mm can be used. For the drive roll 24 and the driven roll 26, SUS rolls having a diameter of 50 mm can be used.

The means for causing the paper P to go around is not limited to the conveyor belt 28. For example, the means may also be configured to suck, retain and rotate the recording paper (paper P) on the peripheral surface of a conveyance roller formed in a cylindrical or columnar shape. However, it is preferable to use the conveyor belt 28 as in the present embodiment because the flat portion 28F is formed, whereby the recording head 30 can be disposed in correspondence to the flat portion 28F.

The recording head 30 includes a long inkjet recording head 32H, in which are arranged plural nozzles (the details of which will be described later) for discharging, in the width direction of the paper P (the direction orthogonal to the conveyance direction), an aggregating liquid (H) (the details of which will be described later) including the property of causing the ink droplets to aggregate, and plural nozzles (the details of which will be described later) for discharging ink droplets in the width direction of the paper P.

A total of five long inkjet recording heads 32, including four inkjet recording heads 32Y, 32M, 32C and 32K corresponding to the four colors of yellow (Y), magenta (M), cyan (C) and black (K), are disposed along the conveyance direction. The inkjet recording heads 32 record dots corresponding to pixels of image data on the paper P by discharging the ink droplets through the nozzles and onto the paper P. Thus, the inkjet recording heads 32 are configured to record a full-color image.

In the present embodiment, the long inkjet recording heads 32Y, 32M, 32C and 32K of the four colors of yellow, magenta, cyan and black and in which plural nozzles for discharging ink droplets are arranged, and the long inkjet recording heads 32H in which plural nozzles for discharging the aggregating liquid are arranged, are arranged along the conveyance direction and configured to record a full-color image, but the number of arranged inkjet recording heads 32 is not limited to five.

The recording head 30 is configured to be immovable in the direction orthogonal to the conveyance direction, but the recording head 30 may also be configured to move as needed. By configuring the recording head 30 in this manner, an image with even higher resolution can be recorded in multi-pass image recording, and it can be ensured that problems with the inkjet recording heads 32 are not reflected in the recorded result.

As shown in FIG. 15B, each of the plural inkjet recording heads 32H, 32Y, 32M, 32C and 32K configuring the recording head 30 includes plural nozzles 33B that are for discharging the aggregating liquid or the ink droplets and are arranged in the width direction of the paper P.

An ink pressure chamber 33C is communicated with the nozzle 33B, and a piezoelectric element 33D is disposed in contact with the ink pressure chamber 33C. As is well known, the piezoelectric element 33D includes the property that its shape is changed by applying a voltage thereto. Using this shape change, pressure is applied to the inside of the ink pressure chamber 33C, whereby the aggregating liquid or the ink droplets is/are discharged from the nozzle 33B to record dots on the paper P.

At this time, as shown in FIGS. 15A and 15C, whether large ink droplets are to be discharged from the nozzle 33B (see FIG. 15B), medium-sized ink droplets are to be discharged from the nozzle 33B, small ink droplets are to be discharged from the nozzle 33B (see FIG. 15D), or no ink droplets are to be discharged from the nozzle 33B, is controlled by controlling the voltage applied to the piezoelectric element 33D (i.e., the drive waveform and the drive voltage). Thus, the amount of ink droplets to be discharged and the amount of aggregating liquid to be discharged can be controlled, whereby the size of the dots (e.g., large droplets, medium-sized droplets, small droplets, or no droplets at all) can be controlled.

In the present embodiment, a case is described where ink droplets are discharged using the piezoelectric element 33D, but the invention is not limited to this. For example, a well-known format such as the thermal format, in which the size of the dots to be recorded by discharging ink droplets is controlled by heating the ink inside the ink pressure chamber 33C, can also be applied.

Five maintenance units 34Y, 34M, 34C, 34K and 34H (collectively referred to below as "the maintenance units 34") corresponding to the inkjet recording heads 32 are disposed in the vicinity of the recording head 30 (in the present embodiment, at both conveyance-direction sides of the recording head 30).

As shown in FIG. 2, when maintenance is conducted with respect to the inkjet recording heads 32, the recording head 30 is moved upward, and the maintenance units 34 move into the space configured between the recording head 30 and the conveyor belt 28. Then, in a state where the maintenance units 34 are facing the nozzle surfaces 32N (see FIG. 3), the maintenance units 34 conduct maintenance processing such as vacuuming, dummy-jetting, wiping, and capping.

In the present embodiment, the five maintenance units 34 are divided into one maintenance unit 34H corresponding to the inkjet recording head 32H that discharges the aggregating liquid (H) and four maintenance units 34Y, 34M, 34C and 34K corresponding to the four inkjet recording heads 32Y, 32M, 32C and 34K. The one maintenance unit 34H and the four inkjet recording heads 32Y, 32M, 32C and 32K are disposed at the upstream side and downstream side of the recording head 30 at the time of image recording.

Figure 3:
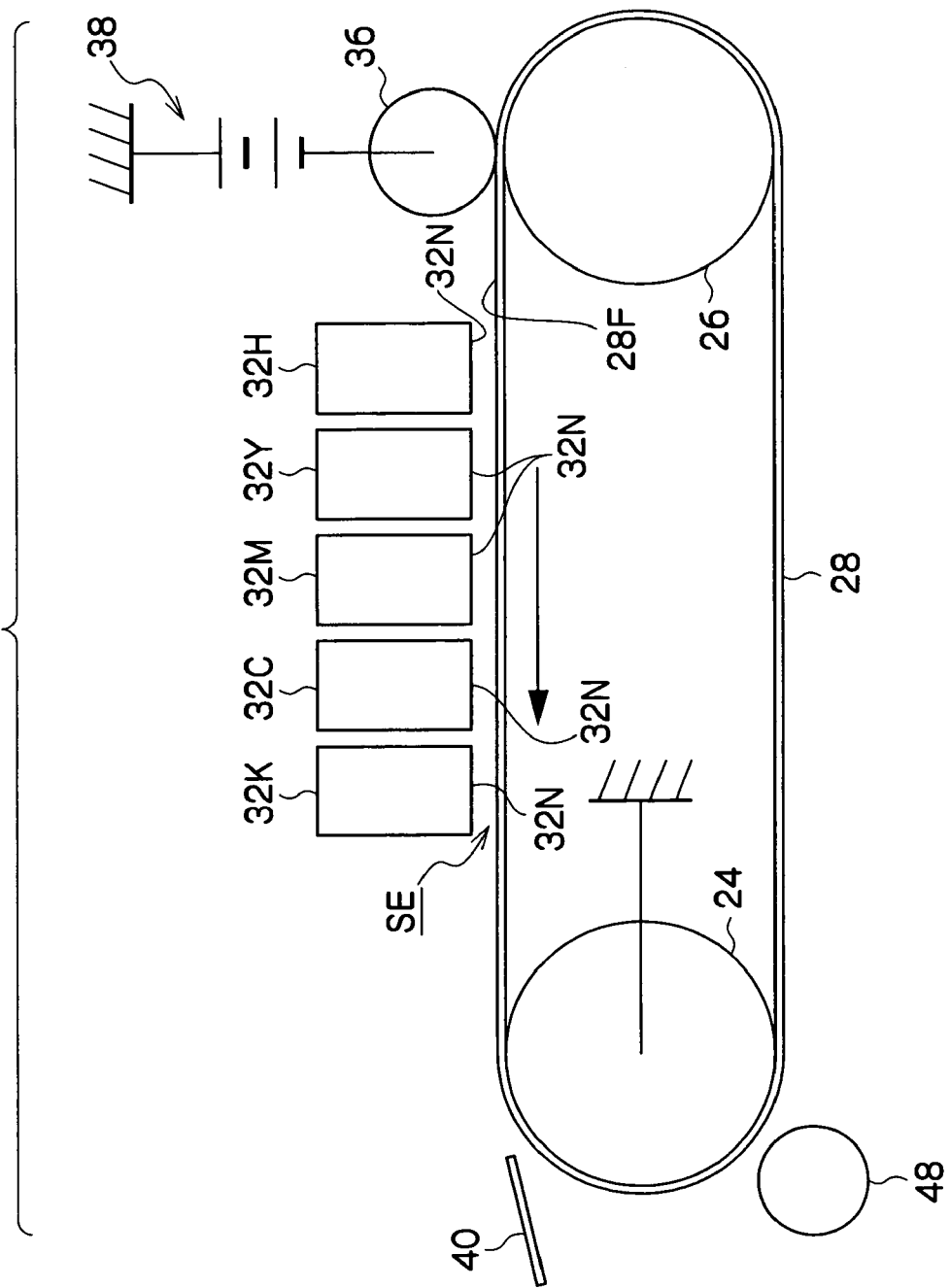
FIG. 3 is a schematic configural diagram showing a conveyor belt and its vicinity in the inkjet recording apparatus pertaining to the invention.

As shown in FIG. 3, a charge roll 36 is disposed at the upstream side of the recording head 30. The charge roll 36 is configured to be movable between a pushing position, at which the charge roll 36 follows the driven roll 26 as the conveyor belt 28 and the paper P are nipped between the charge roll 36 and the driven roll 26 and pushes the paper P against the conveyor belt 28, and a separated position, at which the charge roll 36 is separated from the conveyor belt 28. In the pushing position, the charge roll 36 applies a charge to the paper P to cause the paper P to be electrostatically sucked to the conveyor belt 28 because a predetermined electric potential difference arises between the charge roll 36 and the grounded driven roll 26.

For the charge roll 36, a roll having a diameter of 14 mm and comprising silicone rubber whose surface has been covered with a conductive carbon and whose volume resistance has been adjusted to be about $10^6$ to $10^7$ Ω·cm can be used.

An unillustrated registration roll that aligns the paper P before the paper P is conveyed between the conveyor belt 28 and the charge roll 36 is disposed upstream of the charge roll 36.

A separating plate 40 that separates the paper P from the conveyor belt 28 is disposed at the downstream side of the recording head 30. For the separating plate 40, an aluminium plate having a thickness of 0.5 mm, a width of 330 mm, and a length of 100 mm can be used.

The separated paper P is conveyed by plural discharge roller pairs 42 configuring a discharge path 44 at the downstream side of the separating plate 40 and discharged to a paper discharge tray 46 disposed at an upper portion of the casing 14.

A cleaning roll 48 that can nip the conveyor belt 28 between the cleaning roll 48 and the drive roll 24 is disposed below the separating plate 40. The cleaning roll 48 is configured to clean the surface of the conveyor belt 28.

An inversion path 52 configured by plural inversion roller pairs 50 is disposed between the paper supply tray 16 and the conveyor belt 28. The inversion path 52 causes the paper P on which an image has been recorded on one side to be inverted and retained on the conveyor belt 28, whereby image recording on both sides of the paper P can easily be conducted.

A tank 54H that stores the aggregating liquid and ink tanks 54Y, 54M, 54C and 54K that store inks of the four colors are disposed between the conveyor belt 28 and the paper discharge tray 46 as ink tanks 54.

The aggregating liquid stored in the tank 54H is supplied to the inkjet recording head 30H by an unillustrated ink supply tube. Similarly, the inks stored in the ink tanks 54Y, 54M, 54C and 54K are supplied to the inkjet recording heads 30Y, 30M, 30C and 30K by unillustrated ink supply tubes.

Known types of ink, such as water-based ink, oil-based ink and solvent ink, can be used for the inks stored in the ink tanks 54Y, 54M, 54C and 54K.

The aggregating liquid stored in the tank is a colorless or light-colored ink including a polyvalent metal and has the property of reducing bleeding of the dots by causing the color material in the inks of the colors of yellow, magenta, cyan and black to aggregate. By superposing and dropping the inks of the colors onto the aggregating liquid, bleeding of the inks is reduced and image quality can be improved. Examples of the aggregating liquid include an organic acid reaction liquid, a polyvalent metal reaction liquid, a mixed liquid of an organic acid and a polyvalent metal, and a mixed liquid of an organic acid and an organic amine.

In the inkjet recording apparatus 12 of the present embodiment having this overall configuration, the paper P removed from the paper supply tray 16 is conveyed and supplied to the conveyor belt 28, as described above. Then, the paper P is pressed against the conveyor belt 28 by the charge roll 36 and retained in a state where it is sucked onto the conveyor belt 28 by the voltage applied from the charge roll 36.

In this state, the paper P is passed through the discharge region SE by the circulation of the conveyor belt 28, the aggregating liquid is discharged onto the paper P from the recording head 30, and the ink droplets are discharged onto the paper P from the recording head 30, whereby an image is recorded on the paper P.

The recording paper P on which an image has been recorded is separated from the conveyor belt 28 by the separating plate 40, conveyed by the discharge roller pairs 42, and discharged to the paper discharge tray 46.

Figure 4:
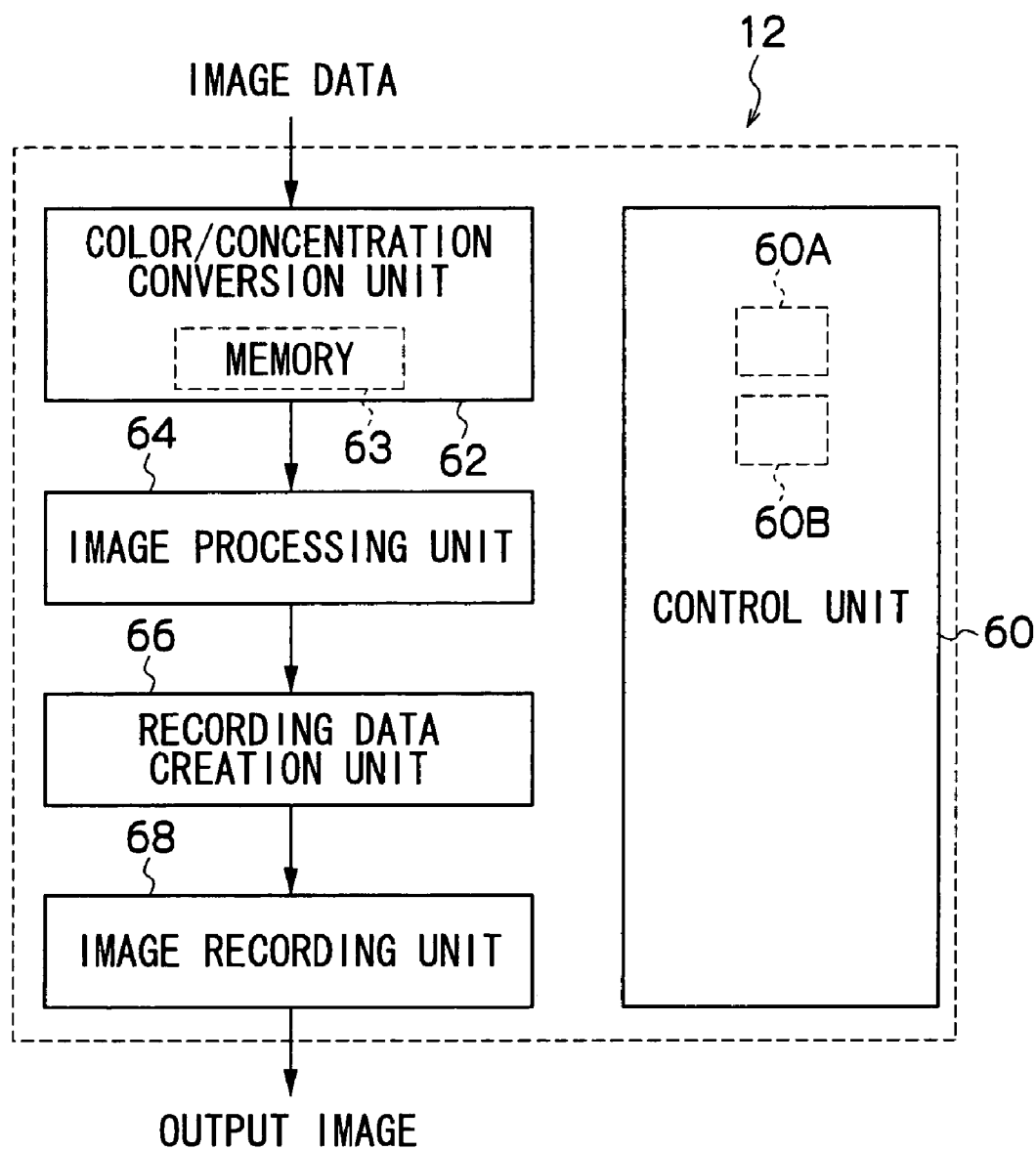
FIG. 4 is a control block diagram of the inkjet recording apparatus pertaining to the invention.

As shown in FIG. 4, the control system of the inkjet recording apparatus 12 pertaining to the present embodiment is configured to include a control unit 60, a color/concentration conversion unit 62, an image processing unit 64, a recording data creation unit 66, and an image recording unit 68. It will be noted that the color/concentration conversion unit 62, the image processing unit 64 and the recording data creation unit 66 may also be disposed in an external device such as a personal computer that outputs image data to the inkjet recording apparatus 12.

The control unit 60 collectively controls the color/concentration unit 62, the image processing unit 64, the recording data creation unit 66 and the image recording unit 68. The image recording unit 68 including the constituent elements relating to image recording within the inkjet recording apparatus 12 described with reference to FIGS. 1 to 3.

The control unit 60 is configured to include a setting unit 60A having the function of setting the amount of the aggregating liquid with respect to the amount of ink droplets to be discharged in correspondence to the pixels. The setting unit 60A is a functional unit that sets the amount of the aggregating liquid with respect to the amount of ink droplets to be discharged in correspondence to the pixels for each pixel of the image data. After the aggregating liquid of an amount set by the setting unit 60A has been discharged in correspondence to each pixel from the recording head 30, ink droplets of the corresponding pixels are discharged over the discharged aggregating liquid.

In the present embodiment, in order to simplify description, a case will be described where the setting unit 60A sets one of "standard" or "less than standard" for each pixel as the percentage of the amount of the aggregating liquid with respect to the amount of the ink droplets. Also, in the present embodiment, when the percentage of the aggregating liquid with respect to the amount of the ink droplets is set to "standard," this will mean that the amount of the aggregating liquid is set to 50%, and when the percentage of the aggregating liquid is set to "less than standard," this will mean that the amount of the aggregating liquid is set to 30%.

Here, when the ink droplets are discharged after the aggregating liquid has been discharged, the ink aggregates due to the effect of the aggregating liquid, and the dots formed on the paper P by the ink droplets become smaller. Thus, when the percentage of the amount of the aggregating liquid is different with respect to the amount of the ink droplets, the color and concentration of the dots formed on the paper P are different even with the same image data.

For this reason, the color/concentration conversion unit 62 conducts color correction and concentration correction corresponding to the characteristics of the paper P and the ink in accordance with the ratio of the amount of the ink droplets and the aggregating liquid to be discharged per pixel of the image data inputted from the outside, i.e., in accordance with the percentage of the amount of the aggregating liquid with respect to the amount of the ink droplets. When the image data comprise RGB data of the three colors of red, green and blue, the color/concentration conversion unit 62 converts the image data to CMYK data of the four colors of cyan, magenta, yellow and black.

The color/concentration conversion unit 62 is configured to include a memory 63. Stored in the memory 63 is a lookup table (called a "color/concentration conversion LUT" below) serving as an image data conversion rule for converting image data in accordance with the percentage of the amount of the aggregating liquid with respect to the amount of the ink droplets for recording the dots, so that differences in the color and concentration when different amounts of the aggregating liquid are discharged become smaller in comparison to when correction is not conducted.

Figure 5A:
FIG. 5A is a schematic diagram showing an example of a lookup table, and shows part of a color/concentration conversion LUT when discharging aggregating liquid in a percentage of 50% with respect to the amount of ink droplets discharged in accordance with pixels.

For example, when the percentage of the amount of the aggregating liquid with respect to the amount of the ink droplets that are discharged when dots corresponding to the pixels are formed on the paper P is 50% (standard), then a color/concentration conversion LUT, part of which is shown in FIG. 5A, is stored in advance in the memory 63 in accordance with the percentage 50% (standard) of the amount of the aggregating liquid with respect to the amount of the ink droplets.

Figure 5B:
FIG. 5B is a schematic diagram showing an example of a lookup table, and shows part of a color/concentration conversion LUT when discharging aggregating liquid in a percentage of 30% with respect to the amount of ink droplets discharged in accordance with pixels.

And, when the percentage of the amount of the aggregating liquid with respect to the amount of the ink droplets that are discharged when dots corresponding to the pixels are formed on the paper P is 30% (less than standard), then a color/concentration conversion LUT, part of which is shown in FIG. 5B, is stored in advance in the memory 63 in accordance with the percentage 30% (less than standard) of the amount of the aggregating liquid with respect to the amount of the ink droplets.

Namely, in the color/concentration conversion LUT, gradation values of the colors of CMYK corresponding to the gradation values of the colors of RGB are determined for each percentage of the amount of the aggregating liquid in order to convert image data comprising RGB data of the three colors of red, green and blue into image data comprising CMYK data of the four colors of cyan, magenta, yellow and black, so that the differences between the color and concentration of the dots formed on the paper P when the percentage of the amount of the aggregating liquid with respect to the amount of the ink droplets is large and the color and concentration of the dots formed on the paper P when the percentage of the amount of the aggregating liquid with respect to the amount of the ink droplets is small are reduced.

In other words, in the color/concentration conversion LUT, gradation values of the colors of CMYK corresponding to the gradation values of the colors of RGB are determined for each percentage of the amount of the aggregating liquid so that the difference in the color and concentration when discharging the aggregating liquid of an amount corresponding to dots recorded in accordance with image data whose colors and concentrations have been converted for each pixel on the basis of the color/concentration conversion LUT corresponding to the amount of the aggregating liquid per pixel becomes smaller with respect to the difference in the color and concentration when discharging the aggregating liquid of an amount corresponding to dots recorded in accordance with image data whose colors and concentrations have been converted for each pixel on the basis of the same (one kind of) color/concentration conversion table LUT, regardless of the percentage of the amount of the aggregating liquid.

In the present embodiment, in order to simplify description, the setting unit 69A will be described as setting one of "standard" and "less than standard" for each pixel as the percentage of the amount of the aggregating liquid with respect to the amount of the ink droplets. When the amount of the aggregating liquid is set to "standard," this will mean that the percentage of the amount of the aggregating liquid is set to 50%, and when the percentage of the aggregating liquid is set to "less than standard," this will mean that the percentage of the amount of the aggregating liquid is set to 30%. However, the percentage of the amount of the aggregating liquid set by the setting unit 60A is not limited to 30% and 50%, and optional values can be set.

Specifically, when the percentage of the amount of the aggregating liquid with respect to the amount of the ink droplets to be discharged in accordance with each pixel is set to "standard," it is preferable for the percentage of the amount of the aggregating liquid to be 20% to 50%, and particularly preferably 25% to 35%.

Also, in the present embodiment, the percentage of the amount of the aggregating liquid set by the setting unit 60A is not limited to the aforementioned two types (standard, and less than standard), and may also be plural types. In this case, plural types of color/concentration conversion LUTs corresponding to percentages of the amount of the aggregating liquid with respect to the amount of the ink droplets set by the setting unit 60A may be created and stored in advance in the memory 63.

Also, in the present embodiment, in order to simplify description, a case will be described where the setting unit 60A determines, as the percentage of the amount of the aggregating liquid with respect to the amount of the ink droplets, 30% and 50% to be the percentage of the amount of the aggregating liquid when set to "standard" and the percentage of the aggregating liquid when set to "less than standard," regardless of the number of types of colors of the ink droplets that are discharged in order to form dots corresponding to the pixels.

Specifically, when the colors of the ink droplets that are discharged in order to form dots corresponding to the pixels are 2-order colors resulting from two types of ink (e.g., cyan color ink and magenta color ink) or 3-order colors resulting from three kinds of ink (e.g., cyan color ink, magenta color ink and yellow color ink), substantially the same image quality can be obtained even when the percentage of the aggregating liquid is lower in comparison to the case of only one kind of ink (e.g., cyan color ink).

For this reason, the amount of the aggregating liquid is determined so that the percentage of the amount of the aggregating liquid with respect to the amount of the ink droplets is slightly less as the colors of the ink droplets to be discharged in order to form dots corresponding to the pixels are colors resulting from plural types of ink (i.e., as the order of the colors becomes higher). In this case, when the percentage of the aggregating liquid in the standard setting in the case of 2-order colors is 25%, for example, the amount of the aggregating liquid is determined so that the percentage of the aggregating liquid in the standard setting in the case of a 1-order color is 20%.

By ensuring this, the total droplet amount, in which the amount of the ink droplets to be discharged in order to form dots corresponding to the pixels and the amount of the aggregating liquid are combined, can be reduced. Thus, the occurrence of stripes on the paper P can be suppressed, and the electrical power consumed for discharging the ink droplets can be suppressed.

On the other hand, by clearly determining the percentage of the aggregating liquid when set to "standard" and the percentage of the aggregating liquid when set to "less than standard" regardless of the number of types of colors of ink droplets that are discharged in order to form dots corresponding to the pixels, the color concentration conversion processing in the color/concentration conversion unit 62 can be conducted at a high speed.

The image processing unit 64 executes quantization (halftone) processing that converts image data whose color and concentration have been converted by the color/concentration conversion unit 62 into image data of a number of gradations recordable by the inkjet recording apparatus 12. This processing is conducted for each of the yellow, magenta, cyan and black colors.

The number of gradations recordable by the inkjet recording apparatus 12 is usually 2 to 8 gradations, but in the present embodiment, the case of the colors of YMCK and four gradations (no droplets, small droplets, medium-sized droplets, and large droplets) will be described. The size of the droplets and the number of the droplets of the aggregating liquid can be changed in accordance with the percentage of the aggregating liquid with respect to the amount of the ink droplets, but here, three cases of three gradations (i.e., a case where the type of the aggregating liquid droplets to be discharged is no aggregating liquid, a case where the amount of the aggregating liquid is standard, and a case where the amount of the aggregating liquid is less than standard) will be described.

The recording data creation unit 66 converts the image data quantized by the image processing unit 64 into a data structure decipherable by the image recording unit 68, rearranges the data into a recording order (transfer order), generates recording data, and outputs (transfers) the recording data to the image recording unit 68. The recording data creation unit 66 generates recording data in consideration of the inkjet recording heads 32 of each color, the discharge timing mapped to the arrangement of the nozzles of the inkjet recording heads 32 of each color, and the data arrangement.

The inkjet recording apparatus 12 pertaining to the present embodiment is configured to not only record dots corresponding to the pixels of image data by discharging ink droplets of the four colors of yellow, magenta, cyan and black, but also to discharge, in correspondence to the recorded dots, aggregating liquid prior to forming the dots corresponding to the pixels. Thus, the recording data creation unit 66 creates aggregating liquid data for the aggregating liquid on the basis of the image data. Similar to the recording data, the recording data creation unit 66 creates the aggregating liquid data in consideration of the discharge timing mapped to the arrangement of the nozzles of the inkjet recording head 32H and the data arrangement.

The image recording unit 68 discharges the aggregating liquid from the inkjet recording head 32H on the basis of the recording data and the aggregating liquid data created by the recording data creation unit 66, and discharges, after discharging the aggregating liquid, the ink droplets from the nozzles of the inkjet recording heads 32 in correspondence to the discharged aggregating liquid. Thus, an image is recorded on the paper P.

Figure 6:
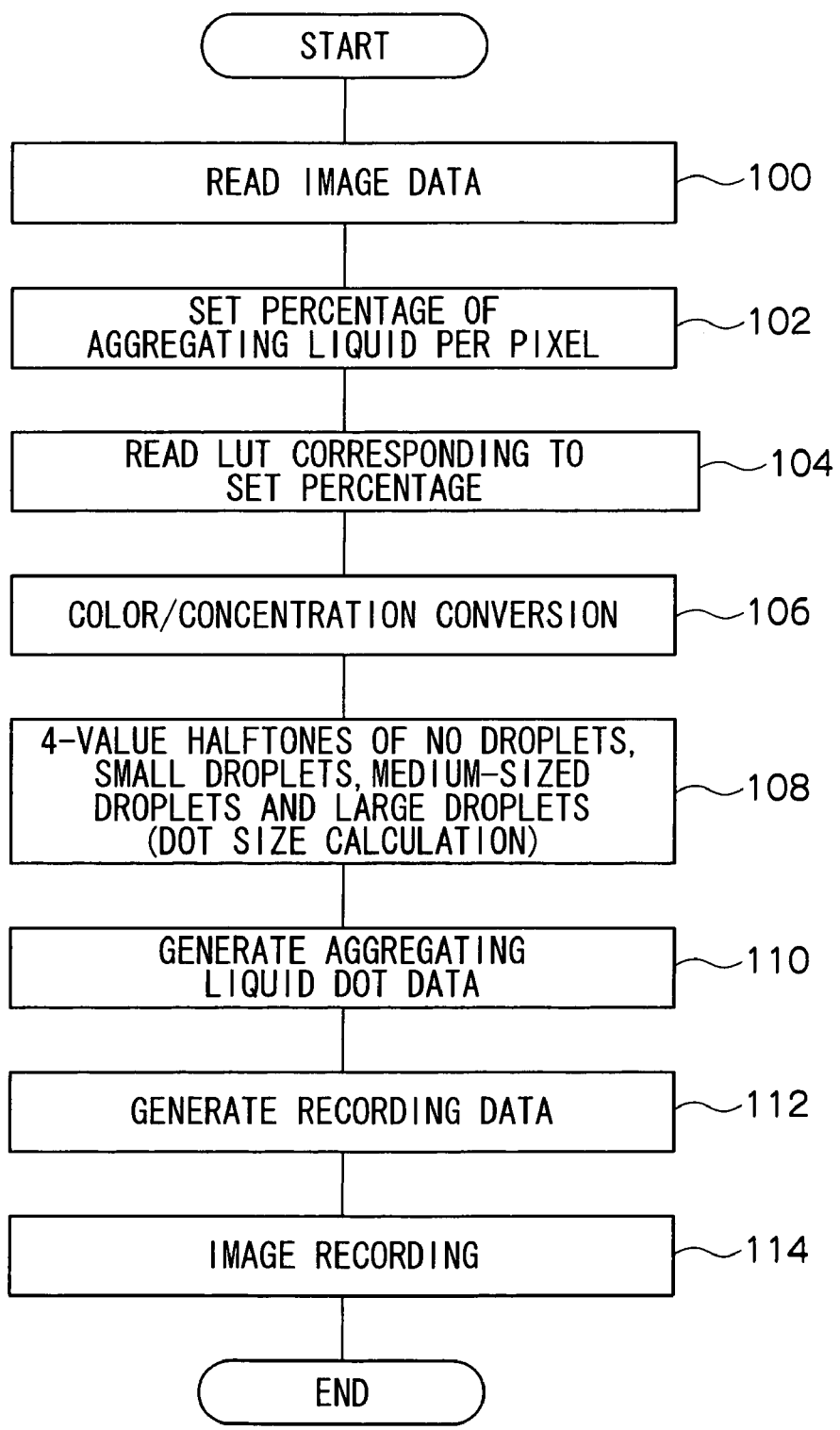
FIG. 6 is a flow chart showing processing that pertains to a first embodiment and is executed by a control unit when using a color/concentration conversion LUT corresponding to the percentage of the aggregating liquid.

When the image data of RGB data are inputted to the inkjet recording apparatus 12, the processing routine shown in FIG. 6 is executed in the control unit 60 and proceeds to step 100, where the inputted image data are read.

In step 102, the percentage of the amount of the aggregating liquid with respect to the amount of the ink droplets of each pixel is set in the setting unit 60A to "standard" or "less than standard" for each pixel of the image data read in step 100.

The percentage of the amount of the aggregating liquid may be stored in advance in the memory 63 per nozzle recording the pixels on the basis of position information of the pixels on the image to be recorded on the paper P, and the stored percentages that have been predetermined in accordance with the pixels to be recorded by the nozzles may be set.

In step 104, the color/concentration conversion LUT corresponding to the percentage of the amount of the aggregating liquid with respect to the amount of the ink droplets per pixel set in step 102 is read from the memory 63. In step 106, the colors and concentrations are converted on the basis of the read color/concentration conversion LUT, whereby the image data of RGB data are converted to image data of YMCK data.

Specifically, the data representing the gradation values of the three primary colors of red, green and blue of the pixels of the image data are converted to YMCK data represented by the gradation values of C, M, Y and K on the basis of the color/concentration conversion LUT corresponding to the percentage of the amount of the aggregating liquid with respect to the amount of the ink droplets per pixel set by the setting unit 60A.

IN step 108, the gradation values of the colors of the pixels of the image data converted by the processing of step 106 are converted to become the four gradations of the gradation value 0, the gradation value 85, the gradation value 170, or the gradation value 255, whereby the size of the dots when recorded is set.

Specifically, one of "no droplets," "small droplets," "medium-sized droplets" and "large droplets" is set as the size of the dots when recorded. The number of gradations recordable by the inkjet recording heads 32 is not limited to four gradations and may also be three types or five types or more.

In step 110, aggregating liquid dot data for the aggregating liquid are created on the basis of the amount of the aggregating liquid with respect to the amount of the ink droplets per pixel set in step 102. Specifically, aggregating liquid dot data are created on the basis of the amount of the aggregating liquid to become one of three gradations (no aggregating liquid, ordinary amount of aggregating liquid, slight amount of aggregating liquid).

The number of gradations of the aggregating liquid is not limited to these three gradations and may also be two gradations or four or more gradations.

Figure 9:
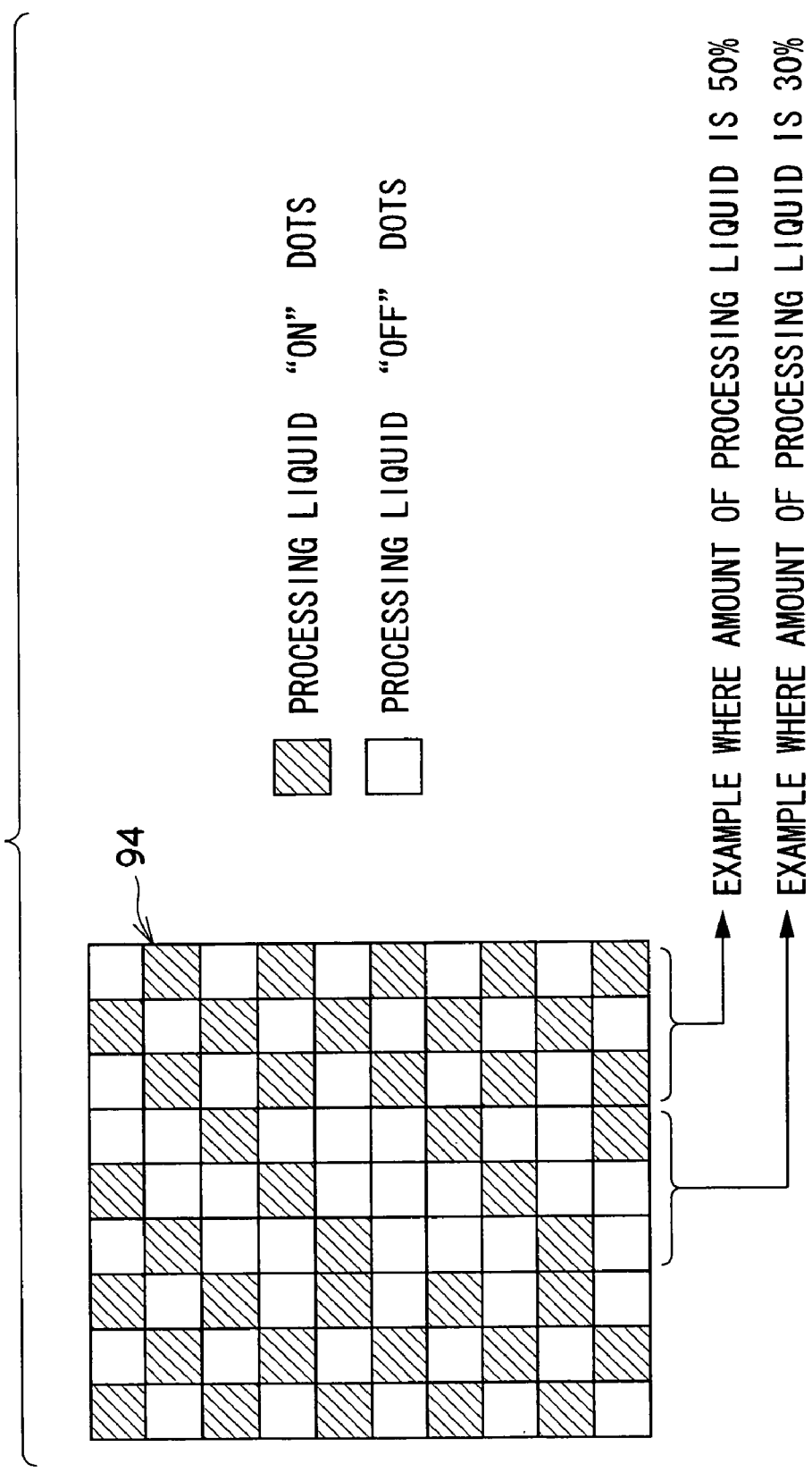
FIG. 9 is a schematic diagram showing an example where aggregating liquid dot data are converted into two gradations (with the aggregating liquid and without the aggregating liquid) and the number of dots within a certain region is changed.

The aggregating liquid dot data can be realized by using two gradations (aggregating liquid, no aggregating liquid) and changing the number of dots within a certain region. Namely, as shown in FIG. 9, the number of ON dots within each region can be determined so that, of the pixels included in image data 94, the number of dots (number of ON dots) to which the aggregating liquid is to be discharged in regions configured by pixels for which the amount of the aggregating liquid has been set to 30% is ⅗ with respect to the number of dots (the number of ON dots) to which the aggregating liquid is to be discharged in regions configured by pixels for which the amount of the aggregating liquid has been set to 50%.

By so doing, the device can be made into a simple structure in comparison to the case of forming large dots of plural types.

In step 112, the image data processed in step 108 are converted to a data structure decipherable by the image recording unit 68, and recording data are created in which the data have been rearranged in a recording order (transfer order).

In step 114, the aggregating liquid dot data generated in step 110 and the recording data created in step 112 are transferred to the image recording unit 68, whereby ink droplets corresponding to the pixels are discharged from the nozzles of the inkjet recording heads 32Y, 32M, 32C and 32K, and the aggregating liquid is discharged in correspondence to the dots from the inkjet recording head 32H prior to the discharge of the ink droplets. Thereafter, the present routine ends.

As described above, in the inkjet recording apparatus 12 of the present invention, the color/concentration LUT for converting the image data in accordance with the percentage of the amount of the aggregating liquid with respect to the amount of the discharge ink droplets that record the dots is stored in advance so that differences in the color and concentration when discharging different percentages of the aggregating liquid with respect to the amount of the ink droplets become smaller. Thus, the image data can be converted on the basis of the LUT corresponding to the percentage of the amount of the aggregating liquid with respect to the ink droplet amount set per pixel. As a result, image quality deterioration can be suppressed because color unevenness and concentration unevenness can be suppressed even when different amounts of the aggregating liquid are discharged.

In the preceding embodiment, a case was described where the color/concentration conversion LUT for converting the color and concentration of image data so that differences in the color and concentration when different percentages of the aggregating liquid are discharged with respect to the amount of the ink droplets become smaller was stored in advance in the memory 63 in accordance with the percentage of the amount of the aggregating liquid corresponding to the ink droplet amount, and where the color and concentration of image data of RGB data were converted by the setting unit 60A to image data of YMCK data on the basis of the color/concentration conversion LUT corresponding to the percentage of the aggregating liquid set per pixel.

The invention may also be configured so that only the concentration of image data of RGB data is corrected so that differences in the concentration when different percentages of the aggregating liquid are discharged with respect to the amount of the ink droplets become smaller.

In this case, a γ correction table serving as a concentration conversion table for correcting the concentration of the image data may be stored in advance in the memory 63 in accordance with the percentage of the amount of the aggregating liquid corresponding to the ink droplet amount so that differences in the concentration when discharging different percentages of the aggregating liquid with respect to the amount of the ink droplets become smaller.

Also, one type of color conversion LUT for color-converting image data of RGB data into image data of CMYK data may also be stored in advance in the memory 63.

In the present embodiment, a case will be described where three types of γ correction tables—a γ correction table corresponding to the standard percentage (e.g., 50%) of the aggregating liquid, a γ correction table corresponding to the "less than standard" percentage (e.g., 30%) of the aggregating liquid, and a γ correction table corresponding to the "no aggregating liquid" percentage of 0%—are stored in advance in the memory 63.

Figure 7:
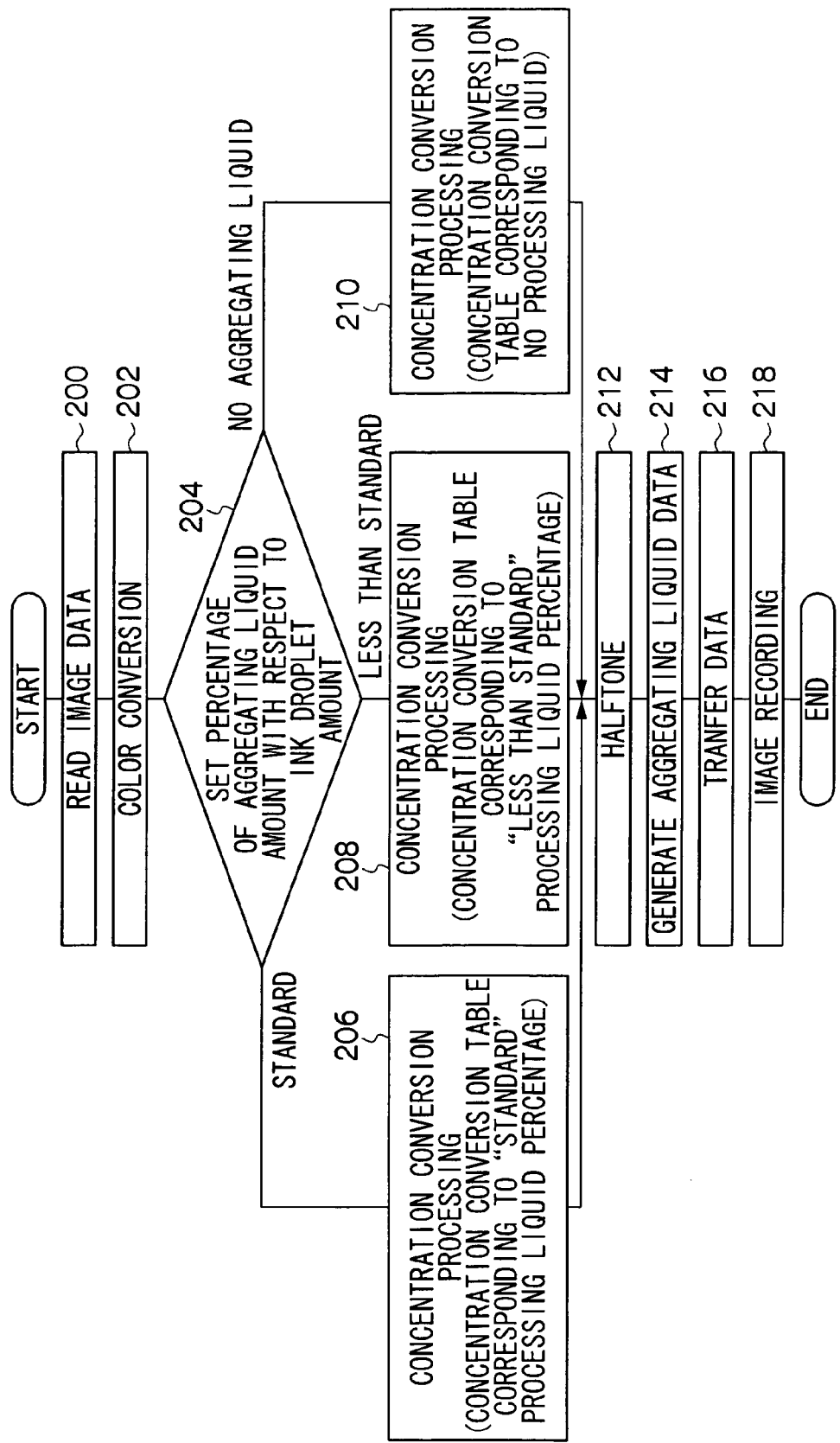
FIG. 7 is a flow chart showing processing that pertains to the first embodiment and is executed by the control unit when using a γ correction table corresponding to the percentage of the aggregating liquid.

In this case, the processing routine shown in FIG. 7 may be executed in the control unit 60. Specifically, when image data of RGB data are inputted to the inkjet recording apparatus 12, the processing routine shown in FIG. 7 is executed in the control unit 60 and proceeds to step 200, where the inputted image data are read per pixel.

In step 202, color conversion processing is executed which converts the data representing the gradation values of the three primary colors of red, green and blue of each pixel of the image data into data represented by the gradation values of cyan, magenta, yellow and black on the basis of the LUT serving as the color conversion table stored in the memory 63.

In step 204, the percentage of the amount of the aggregating liquid with respect to the amount of the ink droplets per pixel is set in the setting unit 60A to one of "standard," "less than standard" and "no aggregating liquid" per pixel of the image data read in step 200.

Similar to step 102, the percentage of the amount of the aggregating liquid may be stored in advance in the memory 63 per nozzle recording the pixels on the basis of position information of the pixels on the image to be recorded on the paper P, and the stored percentages that have been predetermined in accordance with the pixels to be recorded by the nozzles may be set.

When the percentage of the amount of the aggregating liquid with respect to the amount of the ink droplets is set to "standard" in the processing of step 204, the routine proceeds to step 206, where the concentration of the data of the pixels for which the percentage of the amount of the aggregating liquid has been set to "standard" is converted on the basis of the γ correction table serving as the concentration conversion table corresponding to the "standard" percentage of the aggregating liquid. Thereafter, the routine proceeds to step 212.

When the percentage of the amount of the aggregating liquid with respect to the amount of the ink droplets is set to "less than standard" in the processing of step 204, the routine proceeds to step 208, where the concentration of the data of the pixels for which the percentage of the amount of the aggregating liquid has been set to "less than standard" is converted on the basis of the γ correction table serving as the concentration conversion table corresponding to the "less than standard" percentage of the aggregating liquid. Thereafter, the routine proceeds to step 212.

When the percentage of the amount of the aggregating liquid with respect to the amount of the ink droplets is set to "no aggregating liquid" in the processing of step 204, the routine proceeds to step 210, where the concentration of the data of the pixels for which the percentage of the amount of the aggregating liquid has been set to "no aggregating liquid" is converted on the basis of the γ correction table serving as the concentration conversion table corresponding to "no aggregating liquid." Thereafter, the routine proceeds to step 212.

In step 212, the gradation values per color of each pixel of the image data whose concentration has been converted by the processing of steps 206, 208 and 210 are converted to become the four gradation values of the gradation value 0, the gradation value 85, the gradation value 170 and the gradation value 255, whereby the dot size when the dots are recorded is set and halftone processing is executed.

Specifically, one of "no droplets," "small droplets," "medium-sized droplets" and "large droplets" is set as the dot size when the dots are recorded. Similar to step 108, the number of gradations recordable by the inkjet recording apparatus 12 is not limited to these four gradations and may be plural types such as 3 gradations or 5 or more gradations.

In step 214, substantially similar to step 110, aggregating liquid data for the aggregating liquid are generated per pixel on the basis of the percentage of the amount of the aggregating liquid with respect to the amount of the ink droplets per pixel determined in step 204.

In step 216, the image data processed in step 212 are converted to a data structure decipherable by the image recording unit 68, recording data are created in which the data have been rearranged in a recording order (transfer order), the recording data are transferred to the image recording unit 68, the aggregating liquid data processed in step 214 are converted to a data structure decipherable by the image recording unit 68, and the data are rearranged in a transfer order and transferred to the image recording unit 68.

In step 218, ink droplets corresponding to each pixel are discharged by the image recording unit 68 from the nozzles of the inkjet recording heads 32Y, 32M, 32C and 32K, and the aggregating liquid is discharged in correspondence to the dots from the inkjet recording head 32H prior to the discharge of the ink droplets. Thereafter, the present routine ends.

As described with reference to FIGS. 5A and 5B, in the color/concentration conversion LUT, the gradation values of CMYK corresponding to the gradation values of the colors of RGB are determined per percentage of the aggregating liquid so that the image data of RGB data comprising the three colors of red, green and blue are converted to image data of CMYK data of the four colors of cyan, magenta, yellow and black, so that differences in the color and concentration when discharging different percentages of the aggregating liquid with respect to the amount of the ink droplets become smaller. For this reason, in order to create in advance color/concentration conversion LUTs for each percentage of the aggregating liquid and store them in the memory 63, there is the potential for a tremendous amount of creation man-hours to become necessary for the creation of the color/concentration conversion LUTs.

However, by storing in advance, in the memory 63 and in accordance with the percentages of the amount of the aggregating liquid corresponding to the ink droplet amount, γ correction tables where there are few creation man-hours in comparison to color/concentration conversion LUTs for correcting the concentration of the image data so that differences in the color and concentration when discharging different percentages of the aggregating liquid with respect to the amount of the ink droplets become smaller and storing only one color/concentration conversion table where there are few creation man-hours in the memory 63, the creation man-hours can be reduced and the occurrence of concentration unevenness resulting from different percentages of the aggregating liquid being discharged can be suppressed.

In the present embodiment, a case where the color and concentration of the image data were converted so that differences in the color and concentration when discharging different percentages of the aggregating liquid with respect to the amount of the ink droplets become smaller and a case where only the concentration was converted were described, but the invention may also be configured to convert the color of the image data so that at least one of differences in brightness, color saturation and color hue when discharging different percentages of the aggregating liquid with respect to the amount of the ink droplets become smaller.

In this case, a color conversion LUT for color-converting image data of RGB data into image data or YMCK data may be stored in advance in the memory 63 in accordance with the percentage of the amount of the aggregating liquid corresponding to the ink droplet amount so that at least one of differences in brightness, color saturation and color hue when discharging different percentages of the aggregating liquid with respect to the amount of the ink droplets become smaller. Also, a γ correction table serving as one type of concentration conversion table for correcting the concentration may also be stored in advance in the memory 63.

In the present embodiment, a case will be described where three types of color conversion LUTs—a color conversion LUT corresponding to the standard percentage (e.g., 50%) of the aggregating liquid, a color conversion LUT corresponding to the "less than standard" percentage (e.g., 30%) of the aggregating liquid, and a color conversion LUT corresponding to the "no aggregating liquid" percentage of 0%—are stored in advance in the memory 63.

Figure 8:
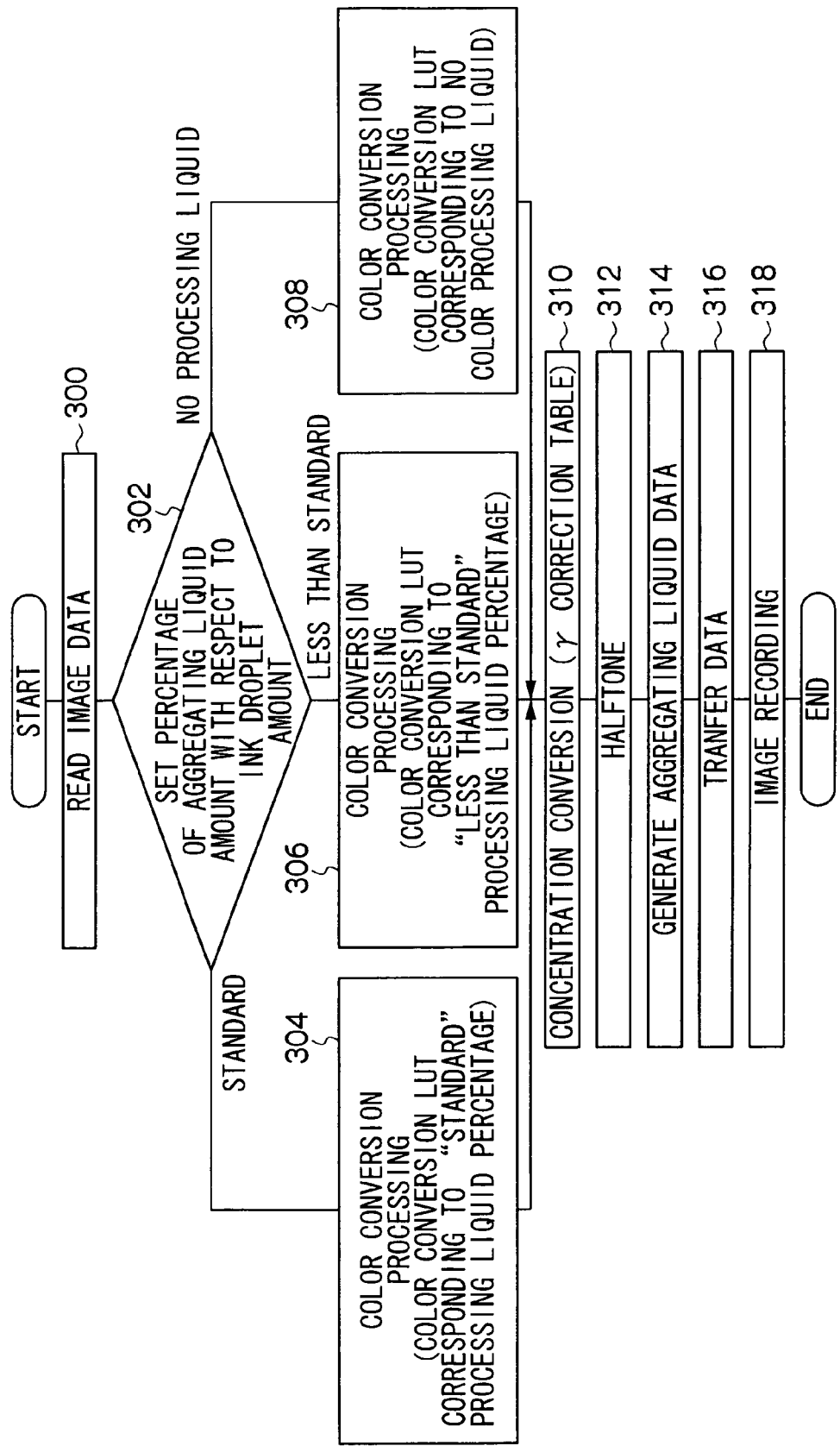
FIG. 8 is a flow chart showing processing that pertains to the first embodiment and is executed by the control unit when using a color conversion LUT corresponding to the percentage of the aggregating liquid.

In this case, the processing routine shown in FIG. 8 may be executed in the control unit 60. Specifically, when image data of RGB data are inputted to the inkjet recording apparatus 12, the processing routine shown in FIG. 8 is executed in the control unit 60 and proceeds to step 300, where the inputted image data are read per pixel.

In step 302, the percentage of the amount of the aggregating liquid with respect to the amount of the ink droplets per pixel is set in the setting unit 60A to one of "standard," "less than standard" and "no aggregating liquid" per pixel of the image data read in step 300.

Similar to step 102, the percentage of the amount of the aggregating liquid may be stored in advance in the memory 63 per nozzle recording the pixels on the basis of position information of the pixels on the image to be recorded on the paper P, and the stored percentages that have been predetermined in accordance with the pixels to be recorded by the nozzles may be set.

When the percentage of the amount of the aggregating liquid with respect to the amount of the ink droplets is set to "standard" in the processing of step 302, the routine proceeds to step 304, where the data represented by RGB of the pixels for which the percentage of the amount of the aggregating liquid has been set to "standard" are converted into data represented by YMCK on the basis of the color conversion LUT corresponding to the "standard" percentage of the aggregating liquid. Thereafter, the routine proceeds to step 310.

When the percentage of the amount of the aggregating liquid with respect to the amount of the ink droplets is set to "less than standard" in the processing of step 302, the routine proceeds to step 306, where the data represented by RGB of the pixels for which the percentage of the amount of the aggregating liquid has been set to "less than standard" are converted into data represented by YMCK on the basis of the color conversion LUT corresponding to the "less than standard" percentage of the aggregating liquid. Thereafter, the routine proceeds to step 310.

When the percentage of the amount of the aggregating liquid with respect to the amount of the ink droplets is set to "no aggregating liquid" in the processing of step 302, the routine proceeds to step 308, where the data represented by RGB of the pixels for which the amount of the aggregating liquid has been set to "no aggregating liquid" are converted into data represented by YMCK on the basis of the color conversion LUT corresponding to "no aggregating liquid." Thereafter, the routine proceeds to step 310.

In step 310, the concentration of the image data color-converted by the processing of steps 304, 306 and 308 is corrected on the basis of the γ correction table stored in the memory 63.

In step 312, the gradation values per color of each pixel of the image data concentration-converted by the processing of step 310 are converted to become the four gradation values of the gradation value 0, the gradation value 85, the gradation value 170 and the gradation value 255, whereby the dot size when the dots are recorded is set and halftone processing is executed.

Specifically, one of "no droplets," "small droplets," "medium-sized droplets" and "large droplets" is set as the dot size when the dots are recorded. Similar to step 108, the number of gradations recordable by the inkjet recording apparatus 12 is not limited to these four gradations and may be plural types such as 3 gradations or 5 or more gradations.

In step 314, substantially similar to step 110, aggregating liquid data for the aggregating liquid are generated per pixel on the basis of the percentage of the amount of the aggregating liquid with respect to the amount of the ink droplets per pixel determined in step 302.

In step 316, the image data processed in step 312 are converted to a data structure decipherable by the image recording unit 68, recording data are created in which the data have been rearranged in a recording order (transfer order), the recording data are transferred to the image recording unit 68, the aggregating liquid data processed in step 314 are converted to a data structure decipherable by the image recording unit 68, and the data are rearranged in a transfer order and transferred to the image recording unit 68.

In step 318, ink droplets corresponding to each pixel are discharged by the image recording unit 68 from the nozzles of the inkjet recording heads 32Y, 32M, 32C and 32K, and the aggregating liquid is discharged in correspondence to the dots from the inkjet recording head 32H prior to the discharge of the ink droplets. Thereafter, the present routine ends.

As described above, a color conversion LUT for converting the colors of the image data is stored in advance in the memory 63 in accordance with the percentage of the amount of the aggregating liquid corresponding to the ink droplet amount so that at least one of differences in brightness, color saturation and color hue when discharging different percentages of the aggregating liquid with respect to the amount of the ink droplets become smaller.

For example, when ink droplets of plural colors are superposed and one dot is formed, the color cannot be sufficiently corrected simply with concentration correction based on the γ correction table corresponding to the percentage of the amount of the aggregating liquid (i.e., fine adjustment of the color is difficult), but by using a color conversion LUT corresponding to the percentage of the amount of the aggregating liquid as described above, differences in the color and concentration can be precisely reduced. Thus, the occurrence of stripes resulting from different percentages of the aggregating liquid being discharged can be suppressed.

Second Embodiment

In the first embodiment, the following cases were described:

a case where, on the basis of a color/concentration conversion LUT for converting the color and concentration of the image data so that differences in the color and concentration when discharging different percentages of the aggregating liquid with respect to the amount of the ink droplets become smaller, the setting unit 60A converts the image data (using the color/concentration conversion LUT) in accordance with the percentage of the aggregating liquid set per pixel;

a case where, on the basis of a color conversion LUT for converting the color of the image data so that at least one of differences in brightness, color saturation and color hue when discharging different percentages of the aggregating liquid with respect to the amount of the ink droplets becomes smaller, the setting unit 60A converts the image data (using the color conversion LUT) in accordance with the percentage of the aggregating liquid set per pixel; and a case where, on the basis of a γ correction table for converting the concentration of the image data so that differences in the concentration when discharging different percentages of the aggregating liquid with respect to the amount of the ink droplets become smaller, the setting unit 60A converts the image data (using the γ correction table) in accordance with the percentage of the aggregating liquid set per pixel.

In the present embodiment, a case will be described where the occurrence of stripes resulting from defective nozzles when defective nozzles, through which it is difficult to discharge ink droplets normally, are included in the plural nozzles disposed in the color inkjet recording heads 32 is suppressed, and where image quality deterioration resulting from different amounts of the aggregating liquid is suppressed.

Specifically, the setting unit 60A determines the percentage of the amount of the aggregating liquid with respect to the amount of the ink droplets per pixel by determining whether each pixel is a pixel to be recorded by a defective nozzle, a pixel to be recorded by a defect-vicinity nozzle in the vicinity of a defective nozzle, or a pixel to be recorded by a normal nozzle separated a predetermined number of nozzles from a defective nozzle. By converting the image data on the basis of a color/concentration conversion LUT corresponding to the percentage of the amount of the aggregating liquid determined by the setting unit 60A, the occurrence of stripes resulting from defective nozzles is suppressed, and image quality deterioration resulting from different amounts of the aggregating liquid is suppressed.

Examples of defective nozzles through which it is difficult to normally discharge ink droplets include non-discharging nozzles that do not discharge the ink droplets at all so that no dots formed, directionally defective nozzles through which it is difficult to discharge ink droplets in a normal direction, defective-discharge amount nozzles that do not discharge the normal amount of ink droplets, and defective-shape nozzles where the impact shape of the dots formed by the discharged ink droplets is poor.

In the present embodiment, first, processing that is executed by the control unit 60 when the defective nozzles are non-discharging nozzles that do not discharge the ink droplets at all so that no dots formed will be described with reference to FIG. 10.

It will be noted that the overall structure of the inkjet recording apparatus and the configuration of the control system in the second embodiment are the same as those in the first embodiment. Thus, detailed description thereof will be omitted.

In the present embodiment, in the memory 63, in which is stored in advance the color/concentration conversion LUT for converting the color and concentration of the image data in accordance with the percentage of the amount of the aggregating liquid with respect to the amount of the discharge ink droplets that record the dots so that differences in the color and concentration when discharging different amounts of the aggregating liquid become smaller, which was described in the first embodiment, position information representing a defective nozzle and type information representing the type of defective nozzle are also stored as information of defective nozzles among the plural nozzles of the color inkjet recording heads 32.

In the present embodiment, a case will be described where the defective nozzle is a non-discharging nozzle. Thus, information representing non-discharging nozzles is stored in the memory 63 as type information representing the type of defective nozzle.

The position information of the defective nozzles and the type information representing the type of defective nozzle are detected in advance at the manufacturing stage of the inkjet recording heads 32 and by reading the image formed by the inkjet recording heads 32, and stored in advance in the memory 63.

Specifically, the defective nozzles may be detected by an electric method or a method in which a test pattern is printed to determine whether there are any defective nozzles.

The electric method may include: applying a drive voltage corresponding to a test signal for detecting defective discharge to the piezoelectric elements 33D (see FIG. 15B) disposed in contact with the ink pressure chambers (see the pressure chamber 33C in FIG. 15B) communicated with the plural nozzles of the inkjet recording heads 32; using a detection unit 60B (see FIG. 4) to compare the response waveform from the piezoelectric elements 33D when the ink droplets are discharged from the nozzles 33B with the response waveform when the ink droplets are normally discharged, and determining, on the basis of this, defective discharge and the type of defective discharge; and storing the determination result in advance in the memory 63 as the position information of the defective nozzles and the information representing the type of defect.

When a test pattern is printed to determine whether there are any defective nozzles, the method may include: disposing, in the inkjet recording apparatus, an optical sensor (not shown) for detecting the dots formed by the ink droplets discharged from the nozzles; comparing, with the result of detection by the optical sensor of the dots formed as a result of this drive voltage being applied to cause the ink droplets to be discharged from nozzles capable of normally discharging the ink droplets, the result of detection by the optical sensor of the dots formed by the ink droplets discharged from the nozzles 33B when a drive voltage corresponding to a predetermined test signal is applied; using the detection unit 60B to determine in advance, on the basis of this comparison, defective discharge and the type of defective discharge; and storing the determination result in advance in the memory 63 as the position information of the defective nozzles and the information representing the type of defect.

The method may also include: inputting the result of determination by the optical sensor (not shown) using an input device (not shown), such as a keyboard or a touch panel, that is disposed in the inkjet recording apparatus and which a user operates when instructing/inputting various types of data; and using the control unit 60B to store, in the memory 63, the position information of the defective nozzles and the information representing the type of defect on the basis of the inputted information.

In the present embodiment, similar to the first embodiment, in order to simplify description, a case will be described where the setting unit 60A sets one of "standard," "less than standard" and "no aggregating liquid" for each pixel as the percentage of the amount of the aggregating liquid with respect to the amount of the ink droplets.

Also, in the present embodiment, when the percentage of the aggregating liquid with respect to the amount of the ink droplets is set to "standard," this will mean that the amount of the aggregating liquid is set to 50%, and when the percentage of the aggregating liquid is set to "less than standard," this will mean that the amount of the aggregating liquid is set to 30%.

The values representing the percentage are not limited to the above values and may also be optionally determined in accordance with the discharge characteristics of the defective nozzles, for example.

Also, when the percentage of the amount of the aggregating liquid with respect to the amount of the ink droplets to be discharged is to be made less than standard, as shown in FIG. 16, the following may be conducted: the standard percentage of the amount of the aggregating liquid with respect to the amount of the ink droplets to be discharged may be determined in advance to be 30% and the ink droplets may be discharged (dot 80A); the "percentage that can most reduce the occurrence of stripes" corresponding to the type of defect (directionally defective, non-discharging, defective-discharge amount, and defective discharge shape) of the defective nozzle when discharging aggregating liquid 80B, 80C, 80D and 80E of amounts such that the percentages of the amount of the aggregating liquid become 0%, 10%, 20% and 30% may be determined in advance prior to the discharge of the ink droplets; and the determined percentage may be determined as the percentage when it is to be made less than the standard percentage.

When image data are inputted to the inkjet recording apparatus 12, the processing routine shown in FIG. 10 is executed in the control unit 60 and proceeds to step 400, where the data of per pixel of the color-converted image data are read. In step 402, the position information representing the position of the non-discharging nozzle is read from the memory 63, and it is determined whether or not each pixel is a pixel recorded by a non-discharging nozzle on the basis of the position information of the non-discharging nozzle and the position information of the read pixels on the image to be recorded on the paper P.

If the determination in step 402 is NO, the processing routine proceeds to step 404, where the distance from the non-discharging nozzle of the nozzles recording the pixels is calculated.

In step 406, it is determined whether or not the discharge from the non-discharging nozzle calculated in step 404 is less than a predetermined distance, whereby it is determined whether or not the pixel is a pixel recorded by a defect-vicinity nozzle in the vicinity of the non-discharging nozzle. If the determination is YES, the processing routine proceeds to step 408.

In step 408, the percentage of the amount of the aggregating liquid with respect to the ink droplet amount corresponding to the pixel to be recorded by the defect-vicinity nozzle is set to "less than standard" (30%).

In step 410, the color/concentration conversion LUT corresponding to the percentage of the aggregating liquid amount set in step 408 is read from the memory 63.

In steps 412 and 414, similar to steps 106 and 108, after the image data have been converted on the basis of the read color/concentration conversion LUT, the gradation values of each color of each pixel of the converted image data are converted to become four gradations, whereby the dot size when the dots are recorded is set. At this time, the dot set is set to become a large dot size in comparison to the dot size determined in accordance with the gradation values of each pixel of the image data.

It will be noted that in the processing of step 414, the dot size may also be determined so that dots of a size as large as the pixels to be recorded by nozzles adjacent to the non-discharging nozzle are formed.

Due to the processing of step 414, the dot size of the ink droplets of pixels to be recorded in the vicinity of a defective nozzle adjacent to pixels to be recorded by the non-discharging nozzle that cannot discharge ink droplets can be set to become larger than the size corresponding to the gradation values corresponding to each pixel.

In step 416, similar to step 110, aggregating liquid dot data are generated per pixel on the basis of the percentage of the amount of the aggregating liquid with respect to the ink droplet amount per pixel set in step 408.

In step 418, the image data processed in step 414, the image data processed in a later-described step 428 and the image data processed in a later-described step 432 are converted to a data structure decipherable by the image recording unit 68, the data are rearranged in a recording order (transfer order), and recording data are generated.

In step 420, the aggregating liquid dot data generated in steps 416, 430 and 434 and the recording data generated in step 418 are transferred to the image recording unit 68. Thus, ink droplets corresponding to each pixel are discharged from the nozzles of the inkjet recording heads 32Y, 32M, 32C and 32K, and the aggregating liquid is discharged in correspondence to the dots from the inkjet recording head 32H prior to the discharge of the ink droplets. Thereafter, the present routine ends.

When the determination in step 402 is YES, the routine proceeds to step 432, where a minimum value "0" is set as the gradation value of the pixel to be recorded by the non-discharging nozzle, whereby "no droplets" is set as the size of the dots to be recorded. In step 434, aggregating liquid dot data are generated so that no aggregating liquid is discharged, and the routine proceeds to step 418.

If the determination in step 406 is NO and the pixel is a pixel to be recorded by a normal nozzle outside the non-discharging nozzle and defect-vicinity nozzles, the routine proceeds to step 422, where the percentage of the amount of the aggregating liquid with respect to the ink droplet amount corresponding to the pixel to be recorded by the normal nozzle is set to "standard" (50%).

In step 424, the color/concentration conversion LUT corresponding to the percentage of the aggregating liquid amount set in step 422 is read from the memory 63. In steps 426 and 428, similar to steps 106 and 108, after the image data are converted on the basis of the read color/concentration conversion LUT, the gradation values of each color of each pixel of the converted image data are converted to become four gradations, and the dot size when the dots are recorded is set.

In step 430, substantially similar to step 110, aggregating liquid dot data are generated per pixel on the basis of the percentage of the amount of the aggregating liquid with respect to the ink droplet amount per pixel set in step 422, and the processing proceeds to step 418.

In the present embodiment, a case where described where the percentage of the aggregating liquid amount was set to "less than standard" in the processing of step 408, but the percentage may also be set so that the aggregating liquid is not discharged.

Figure 11A:
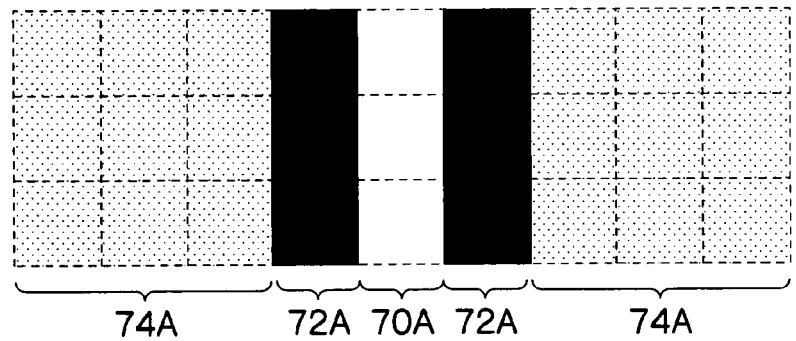
FIG. 11A is a schematic diagram pertaining to the second embodiment of the invention showing an amount of ink droplets that are discharged in correspondence to nozzles of an inkjet recording head including non-discharging nozzles as defective nozzles.
Figure 11B:
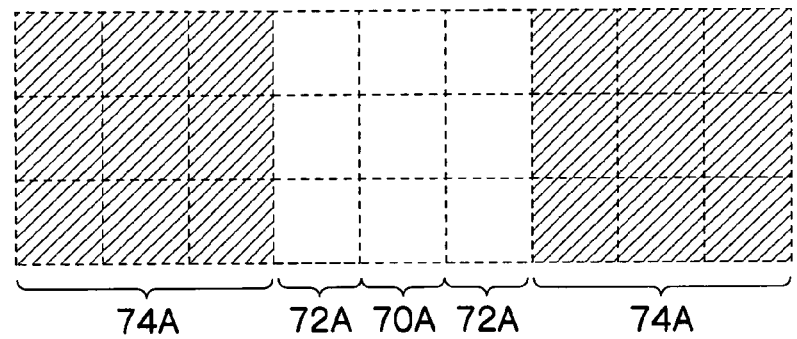
FIG. 11B is a schematic diagram pertaining to the second embodiment of the invention showing an amount of aggregating liquid that is discharged in correspondence to dots discharged from nozzles of an inkjet recording head including non-discharging nozzles.
Figure 11C:
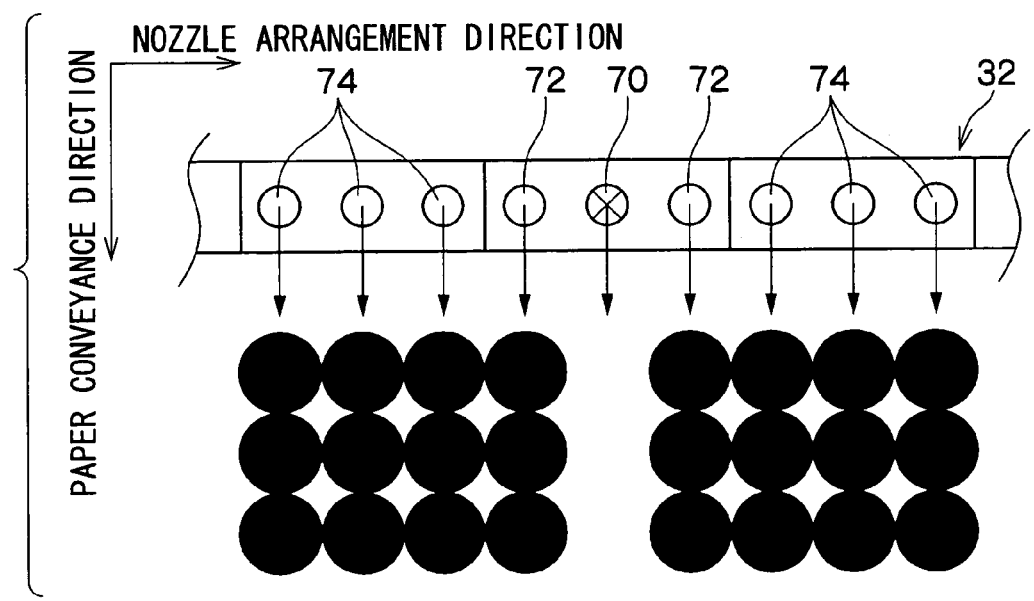
FIG. 11C is a schematic diagram pertaining to the second embodiment of the invention showing dots on paper when ink droplets of a uniform dot size are discharged from inkjet recording heads including non-discharging nozzles and when aggregating liquid having a uniform percentage with respect to the discharged ink droplet amount is discharged.

As shown in FIG. 11C, when a non-discharging nozzle 70 that cannot discharge ink droplets is included in the color inkjet recording heads 32 and ink droplets are discharged in accordance with the data of each pixel and, hypothetically, "standard" is set as the amount of the aggregating liquid with respect to the amount of the ink droplets to be discharged with respect to all pixels when the processing of steps 400 and 402 is executed, a stripe resulting from the fact that ink droplets were not discharged from the non-discharging nozzle is formed on the image, as shown in FIG. 11C.

However, when "a little" is set as the amount of the aggregating liquid with respect to the amount of the ink droplets to be discharged with respect to all pixels, recording data are generated so that ink droplets are not discharged at the pixel 70A recorded by the non-discharging nozzle 70, as shown in FIG. 11A, the dots are enlarged at the pixels 72A recorded by defect-vicinity nozzles 72, and large dots corresponding the gradation values of each pixel are formed at the pixels 74A recorded by normal nozzles 74 outside the non-discharging nozzle 70 and the defect-vicinity nozzles 72.

In this case, as shown in FIG. 11B, setting can be done so that the percentage of the amount of the aggregating liquid to be discharged with respect to the amount of the ink droplets is made less than standard in regard to the pixels 70A recorded by the non-discharging nozzle 70 and the pixels 72A recorded by the defect-vicinity nozzles 72, and so that the aggregating liquid is discharged in the standard percentage at the pixels 74A recorded by the normal nozzles 74.

In this manner, the amount of the ink droplets of the pixels recorded by the defect-vicinity nozzles can be increased to enlarge the dot size, and the amount of the aggregating liquid can be set to "less than standard" or "no aggregating liquid" in regard to the pixels recorded by the non-discharging nozzle and the defect-vicinity nozzles. Thus, the aggregation of ink in the vicinity of the non-discharging nozzle can be suppressed. In other words, the occurrence of stripes resulting from non-discharging nozzles can be suppressed.

As described above, in the inkjet recording apparatus 12 of the present embodiment, the percentage of the amount of the aggregating liquid with respect to the ink droplet amount to be discharged can be set to be less than the percentage of the aggregating liquid of pixels recorded by normal nozzles or so that the aggregating liquid is not discharged in regard to pixels to be recorded by non-discharging nozzles that cannot discharge ink droplets and pixels recorded by defect-vicinity nozzles in the vicinity of the non-discharging nozzle. Thus, the aggregation resulting from the aggregating liquid of dots corresponding to pixels to be recorded by defective nozzles can be suppressed and the dots can be enlarged in comparison to dots corresponding to pixels recorded by normal nozzles. In other words, the occurrence of stripes resulting from defective nozzles can be suppressed.

Also, because the color and concentration of image data can be converted per pixel on the basis of the color/concentration conversion LUT corresponding to each percentage of the aggregating liquid, the occurrence of color unevenness and concentration unevenness resulting from the amounts of the aggregating liquid being different can be suppressed.

Also, in the present embodiment, a case was described where the percentage of the amount of the aggregating liquid with respect to the amount of the ink droplets per pixel was set by determining whether the pixels were pixels to be recorded by non-discharging nozzles, pixels to be recorded by defect-vicinity nozzles, or pixels to be recorded by normal nozzles, and image data were created on the basis of the color/concentration LUT corresponding to the percentage of the amount of aggregating liquid that was set.

As described in the first embodiment, the invention may include: storing, in advance in the memory 63 in accordance with the percentage of the aggregating liquid, a γ correction table for converting the concentration of the image data so that differences in the concentration when discharging different percentages of the aggregating liquid with respect to the amount of the ink droplets become smaller, and storing one type of color conversion LUT; using the setting unit 60A to convert the image data on the basis of the γ correction table corresponding to the percentage of the aggregating liquid set per pixel; and conducting color conversion of the image data on the basis of the one kind of color conversion LUT.

In any case, the percentage of the amount of the aggregating liquid with respect to the ink droplet amount to be discharged is set to be smaller than the percentage of the aggregating liquid of the pixels to be recorded by the normal nozzles or so that the aggregating liquid is not discharged in regard to pixels to be recorded by non-discharging nozzles that cannot discharge the ink and pixels to be recorded by defect-vicinity nozzles in the vicinity of the non-discharging nozzle.

Thus, the aggregation resulting from the aggregating liquid of dots corresponding to pixels to be recorded by defective nozzles can be suppressed and the dots can be enlarged in comparison to dots corresponding to pixels recorded by normal nozzles. In other words, the occurrence of stripes resulting from defective nozzles can be suppressed.

In the preceding embodiment, a case was described where non-discharging nozzles incapable of discharging ink droplets at all were the intended defective nozzles. In cases where the defective nozzle is a directionally defective nozzle through which it is difficult to discharge the ink droplets in the normal direction, a defective-discharge amount nozzle that discharges an amount of the ink droplets to be discharged that is different from the normal amount, or a defective-shape nozzle in which the impact shape of the dots formed by the discharged ink droplets is poor, the "non-discharging nozzle" in the processing routine of FIG. 10 may be processed as a "directionally defective nozzle," a "defective-discharge amount nozzle," or a "defective-shape nozzle."

Also, in step 402 (see FIG. 10), it may be determined whether the read pixel is a pixel to be recorded by a directionally defective nozzle, a defective-discharge amount nozzle, or a defective-shape nozzle.

Also, the invention may be configured so that if the determination in step 402 is YES, then the routine proceeds to step 408, the percentage of the aggregating liquid is set to "slightly less than normal" or "no aggregating liquid," and the processing of steps 408 to 420 is executed.

Figure 12A:
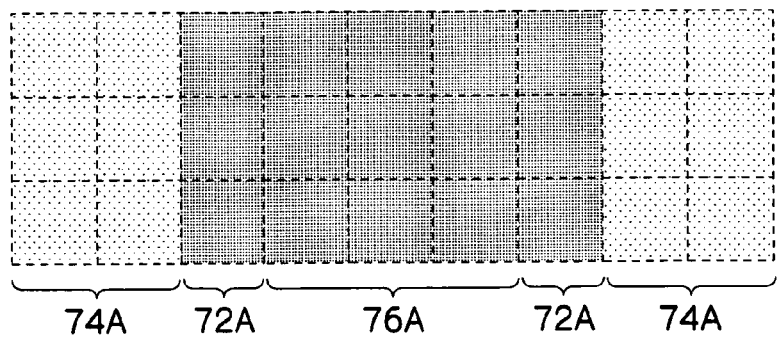
FIG. 12A is a schematic diagram pertaining to the second embodiment of the invention showing an amount of ink droplets discharged in correspondence to nozzles of an inkjet recording head including directionally defective nozzles as defective nozzles.
Figure 12B:
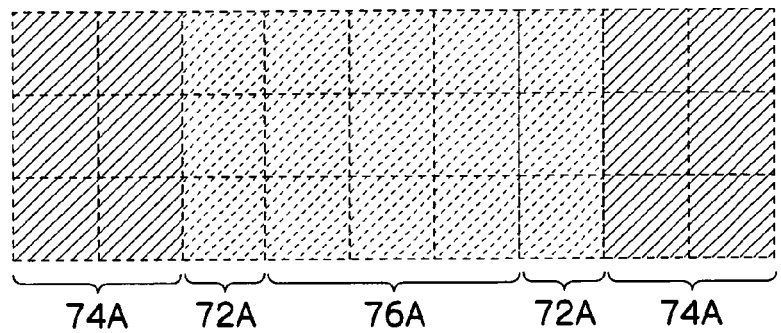
FIG. 12B is a schematic diagram pertaining to the second embodiment of the invention showing an amount of aggregating liquid discharged in correspondence to dots discharged from nozzles of an inkjet recording head including directionally defective nozzles.
Figure 12C:
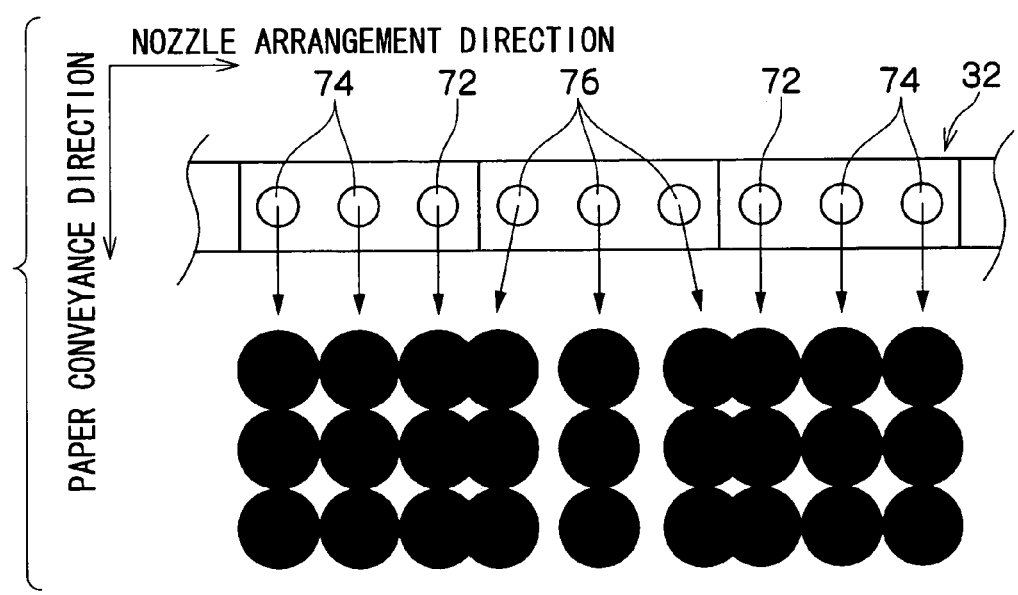
FIG. 12C is a schematic diagram pertaining to the second embodiment of the invention showing dots on paper when ink droplets of a uniform dot size are discharged from inkjet recording heads including directionally defective nozzles and when aggregating liquid having a uniform percentage with respect to the discharged ink droplet amount is discharged.

By configuring the invention in this manner, when the percentage of the aggregating liquid is set to a uniform percentage and not values that are different per pixel when directionally defective nozzles 76 are included in the color inkjet recording heads 32, as shown in FIG. 12C, a stripe resulting from the directionally defective nozzles 76 is formed on the image.

However, according to the present invention, at pixels 76A and 72A to be recorded by the directionally defective nozzles 76 and defect-vicinity nozzles 72 adjacent to the directionally defective nozzles 76, the gradation values of the pixels can be set in accordance with the color/concentration conversion LUT.

Also, as shown in FIG. 12B, at the pixels 72A to be recorded by the defect-vicinity nozzles 72 adjacent to the directionally defective nozzles 76, the percentage of the aggregating liquid with respect to the amount of the ink droplets can be set to be less than standard (or to no aggregating liquid), and at the pixels 74A to be recorded by the normal nozzles 74, the percentage of the aggregating liquid with respect to the amount of the ink droplets can be set to standard.

For this reason, the percentage of the aggregating liquid to be discharged prior to the discharge of the ink droplets can be set to be less than the standard percentage, or the aggregating liquid can be set to not be discharged. Thus, the aggregation of the ink droplets discharged from the directionally defective nozzles 76 and the defect-vicinity nozzles 72 can be suppressed. As a result, the dots of the ink droplets of the pixels to be recorded by the directionally defective nozzles and the nozzles in the vicinity of the directionally defective nozzles become larger, and the occurrence of stripes resulting from the directionally defective nozzles 76 can be suppressed.

Similarly, there are cases where the defective nozzle is a defective-discharge amount nozzle, which has variations in the discharge amount where the amount of the ink droplets to be discharged is different from the normal amount, or a defective-shape nozzle, which gives rise to defects (variations) in the impact shape of the dots formed by the discharged ink droplets.

Figure 13A:
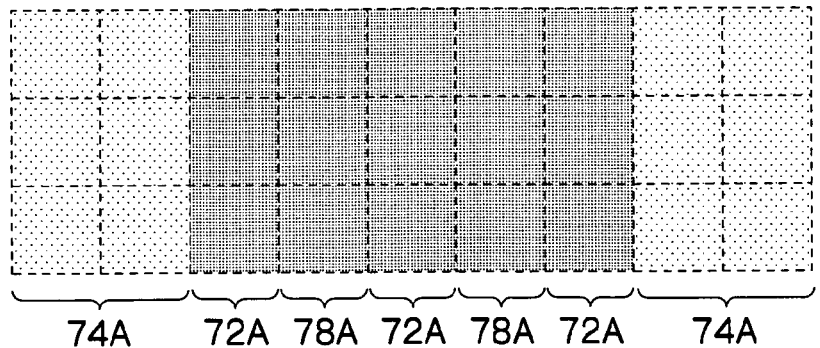
FIG. 13A is a schematic diagram pertaining to the second embodiment of the invention showing an amount of ink droplets discharged in correspondence to nozzles of an inkjet recording head including defective-discharge amount nozzles and defective-shape nozzles as defective nozzles.
Figure 13B:
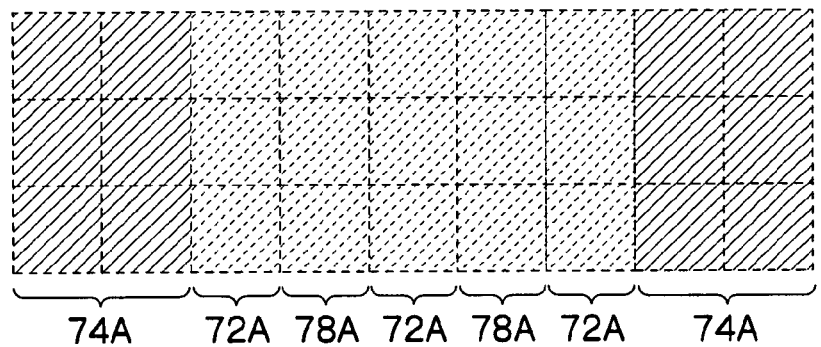
FIG. 13B is a schematic diagram pertaining to the second embodiment of the invention showing an amount of aggregating liquid discharged in correspondence to dots discharged from nozzles of an inkjet recording head including defective-discharge amount nozzles and defective-shape nozzles.
Figure 13C:
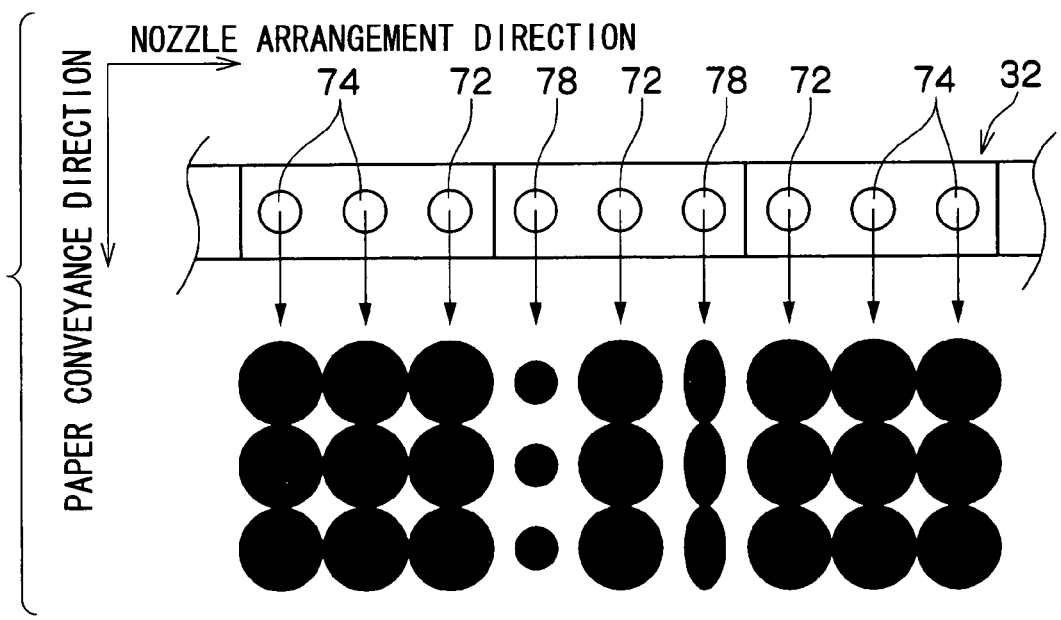
FIG. 13C is a schematic diagram pertaining to a conventional method showing dots on paper when ink droplets of a uniform dot size are discharged from inkjet recording heads including defective-discharge amount nozzles and defective-shape nozzles and when aggregating liquid having a uniform percentage with respect to the discharged ink droplet amount is discharged.
Figure 14A:
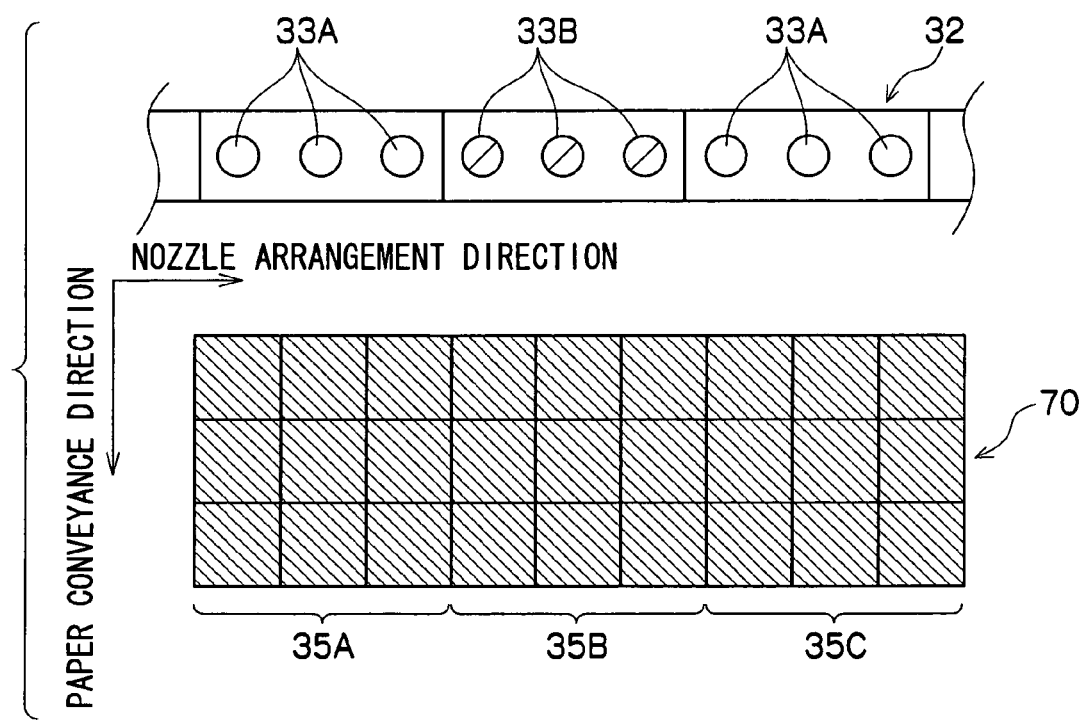
FIG. 14A is a schematic diagram pertaining to the second embodiment of the invention showing a case where an image, which corresponds to image data in which the color and concentration within the same image are uniform, is recorded with an inkjet recording head including a short unit including directionally defective nozzles, and is an image diagram showing dot distribution.
Figure 14B:
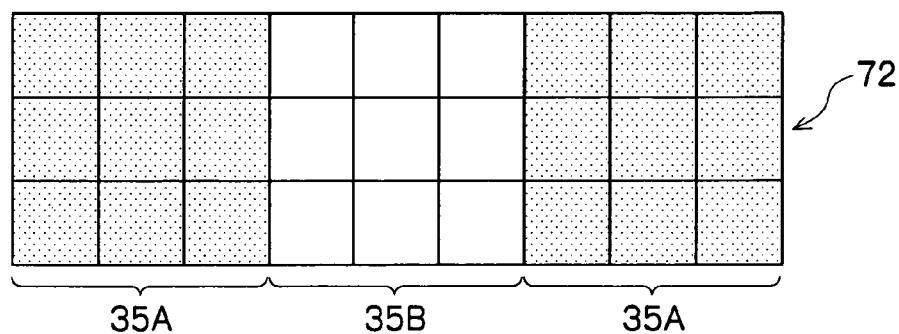
FIG. 14B is an image diagram pertaining to the second embodiment of the invention showing aggregating liquid distribution in a case where an image, which corresponds to image data in which the color and concentration within the same image are uniform, is recorded with an inkjet recording head including a short unit including directionally defective nozzles.

For example, as shown in FIG. 13C, when the percentage of the amount of the aggregating liquid is set to a uniform "standard" percentage without being set per pixel in a case where defective-discharge amount nozzles or defective-shape nozzles 78 are included in the color inkjet recording heads 32, stripes resulting from the defective-discharge amount nozzles or defective-shape nozzles are formed on the image, as shown in FIG. 13C.

However, according to the present invention, as shown in FIG. 13A, in the pixels 78A and 72A to be recorded by defective-discharge amount nozzles or defective-shape nozzles 78 and defect-vicinity nozzles 72 adjacent to these nozzles 78, the dots can be made larger than the size corresponding to the gradation values of each pixel, and at the pixels 74A to be recorded by the normal nozzles 74, setting can be done so that dots of a size corresponding to the gradation values of each pixel are formed.

Also, as shown in FIG. 13B, at the pixels 72A and 78A to be recorded by the defective-discharge amount nozzles and defective-shape nozzles 78, the percentage of the aggregating liquid with respect to the amount of the ink droplets can be made less than standard (or no aggregating liquid), and at the pixels 74A to be recorded by the normal nozzles 74, the percentage of the aggregating liquid with respect to the amount of the ink droplets can be set to standard.

For this reason, the percentage of the aggregating liquid to be discharged prior to the discharge of the ink droplets can be set to be less than the standard percentage, or the aggregating liquid can be set to not be discharged. Thus, the aggregation of the ink droplets discharged from the defective-discharge amount nozzles and defective-shape nozzles and the defect-vicinity nozzles in the vicinity of these nozzles can be suppressed. As a result, the dots of the ink droplets of the pixels to be recorded by the defective discharge nozzles and the defective-shape nozzles become larger, and the occurrence of stripes on the image resulting from the defective-discharge amount nozzles and the defective-shape nozzles can be suppressed.

In this manner, the percentage of the aggregating liquid with respect to the amount of the ink droplets discharged per pixel recorded by the nozzles can be set by the setting unit 60A to match the discharge characteristics of each nozzle, whereby the percentage of the aggregating liquid can be determined per pixel and the color and concentration can be converted on the basis of the color/concentration conversion LUT corresponding to the percentage of the amount of the aggregating liquid per pixel. Thus, excellent image quality can be obtained.

The long color inkjet recording heads 32Y, 32M, 32C and 32K in which the plural nozzles are arranged are usually configured by connecting, in the arrangement direction of the nozzles, plural short inkjet recording heads (called "units" below) in which plural nozzles are arranged.

However, due to manufacturing variations and the like, sometimes short units including nozzles that have defective discharge characteristics and through which it is difficult to normally discharge ink droplets are included in the plural short units configuring the long inkjet recording heads 32. By unpreferred discharge characteristics is meant that the nozzle does not discharge, that there are shifts in the discharge direction, variations in the discharge amount, or that the impact shape of the dots is defective. When discharge of the ink droplets is conducted using short units having defective discharge characteristics, stripes and unevenness occur in the image formed in accordance with the short units.

However, the occurrence of color unevenness and stripe unevenness in the entire image can be suppressed by executing the processing of steps 400 to 420, even when the image is recorded by long inkjet recording heads 32 configured by short units having defective discharge directionality.

When processing is done with short units, the invention may be configured so that the detection unit 60B detects in advance whether or not the unit is a short unit whose short units include defective nozzles and stores the detection result in advance in the memory 63 as information representing the units.

Specifically, similar to the case described above where the position information of defective nozzles and the type of defect are detected per nozzle by the detection unit 60B, the detection unit 60B may be configured to use an electric method or a method in which a test pattern is printed to determine whether the units include any defective nozzles and the type of the defect.

The control unit 60 may be configured to execute the same processing as in FIG. 10. That which is different with the processing of steps 400 to 434 described in FIG. 10 is that, here, the control unit 60 conducts processing per pixel to be recorded by the units rather than conducting processing in pixel units. Specifically, the control unit 60 may be configured to conduct, in the processing of step 402, processing that determines per pixel whether the pixel is a pixel recorded by a defective nozzle to determine, per pixel recorded by the units, if the pixel is a pixel recorded by a defective nozzle.

Similarly, the control unit 60 may be configured to conduct, in the processing of step 406, processing that determines per pixel whether the pixel is a pixel recorded by a defect-vicinity nozzle to determine, per pixel recorded by the units, if the pixel is a pixel recorded by a defective nozzle.

By configuring the invention in this manner, the amount of the aggregating liquid can be set in units of each short unit, and the setting of the amount of the aggregating liquid can be conducted effectively in comparison to when the setting of the amount of the aggregating liquid is conducted per pixel.

Also, by configuring the invention in this manner, the percentage of the aggregating liquid can be set per plural pixels recorded by the short units in units of short units where plural nozzles are used as one unit. Thus, the color/ concentration conversion LUT corresponding to the percentage of the aggregating liquid can be read per unit, and color/concentration conversion processing can be conducted on the basis of the read color/concentration conversion LUT.

Specifically, when processing is conducted in units of the short units, for example, at the short defective unit 33B including nozzles whose discharge directionality is bad and through which it is difficult to discharge ink droplets in the proper direction, the percentage of the amount of the aggregating liquid with respect to the ink droplet amount to be discharged can be set to be less than standard (e.g., 30%) or so that the aggregating liquid is not discharged, and at the short proper units 33A configured by proper nozzles, the percentage of the amount of the aggregating liquid with respect to the ink droplet amount to be discharged can be set to standard (e.g., 50%).

For this reason, the aggregation of the dots 35B recorded by the defective unit 33B is low in comparison to the dots recorded by the proper units 33A, so that the occurrence of stripes resulting from the defective unit 33B can be suppressed. Also, because color/concentration conversion can be conducted in accordance with the color/concentration conversion LUT corresponding to the amount of the aggregating liquid, control can be done so that differences in the color and concentration become smaller even when the amounts of the aggregating liquid are different.

When color conversion and concentration conversion are conducted in accordance with the color/concentration conversion LUT corresponding to the percentage of the aggregating liquid per pixel recorded by the nozzles, the amount of the aggregating liquid can be determined in detail. Thus, detailed color conversion and concentration conversion can be conducted, and a high-definition image can be formed.

When the color/concentration conversion LUT corresponding to the percentage of the aggregating liquid is read per short unit as described above and color/concentration conversion processing is conducted on the basis of the read color/concentration conversion LUT, color/concentration conversion can be effectively conducted.

In the preceding embodiments, cases were described where the invention was applied to an inkjet printer that forms a color image, but the invention can also be applied to a black-and-white inkjet printer.

Also, in the preceding embodiments, a case was described using a long recording head array where the effective recording region had a length equal to or greater than the width of the paper, but the invention can also be applied to an inkjet printer that records an image while scanning, in the direction orthogonal to the conveyance direction of the paper, a recording head array where the effective recording region has a length less than the width of the paper.

Further, in the preceding embodiments, a case was described using plural inkjet recording heads correspond to color of ink and the aggregating liquid, however the invention can also be applied to an inkjet printer that includes one inkjet recording head discharging both droplets of ink and droplets of aggregating liquid.

What is claimed is:

1. An image forming apparatus comprising:
   a recording head that record dots corresponding to pixels of image data by discharging ink droplets from plural nozzles and discharge, in correspondence to the dots, colorless or light-colored aggregating liquid that causes color material in the ink to aggregate;
   a storage means that stores an image data conversion rule for converting the image data per pixel in accordance with the percentage of the amount of the aggregating liquid with respect to the amount of the discharge ink droplets that record the dots, with the image data conversion rule being determined so that differences in one or both of color and concentration when discharging different amounts of the aggregating liquid onto the dots recorded on the basis of the image data after conversion in accordance with the image data conversion rule become smaller with respect to differences in one or both of color and concentration when discharging different amounts of the aggregating liquid onto the dots recorded on the basis of the image data prior to conversion;
   a setting means that sets the percentage of the amount of the aggregating liquid with respect to the amount of the ink droplets discharged in correspondence to the pixels of the image data;
   a converting means that converts the image data on the basis of the image data conversion rule corresponding to the percentage of the amount of the aggregating liquid set by the setting means; and
   a control means that controls the recording head to record dots in accordance with the image data converted by the converting means and controls the recording head to discharge, in correspondence to the dots, the aggregating liquid of which amount corresponds to the amount of the aggregating liquid of the percentage set by the setting means.

2. The image forming apparatus of claim 1, further comprising a classifying means that classifies the pixels of the image data into first pixels recorded by defective nozzles that cannot form proper dots and defect-vicinity nozzles in the vicinity of the defective nozzles and second pixels recorded by normal nozzles outside the defective nozzles and the defect-vicinity nozzles, wherein
   the setting means sets the percentage of the amount of the aggregating liquid so that the percentage of the amount of the aggregating liquid with respect to the amount of the ink droplets discharged in correspondence to the first pixels becomes less than the percentage of the amount of the aggregating liquid with respect to the amount of the ink droplets discharged in correspondence to the second pixels.

3. The image forming apparatus of claim 2, further comprising a detecting means for detecting defective nozzles that cannot form proper dots among the plural nozzles of the recording head, wherein the classifying means classifies the pixels of the image data into the first pixels and the second pixels on the basis of the detection result of the detecting means.

4. An image forming apparatus of claim 1 wherein:
   the setting means is adapted to set, per block when the plural nozzles of the recording head are divided into plural blocks in accordance with their disposed position, the percentage of the amount of the aggregating liquid with respect to the amount of the ink droplets discharged in correspondence to the pixels of the image data by the nozzles; and
   the control means is adapted to control the recording head to record dots in accordance with the image data converted by the converting means and control the recording head, per the block, to discharge, in correspondence to the dots, the aggregating liquid of which amount corresponds to the amount of the aggregating liquid of the percentage set by the setting means.

5. The image forming apparatus of claim 4, further comprising a classifying means that classifies the pixels of the image data into first pixels recorded by nozzles belonging to blocks including defective nozzles that cannot form proper dots and defect-vicinity nozzles in the vicinity of the defective nozzles and second pixels recorded by nozzles belonging to blocks including normal nozzles outside the defective nozzles and the defect-vicinity nozzles, wherein the setting means sets the percentage of the amount of the aggregating liquid so that the percentage of the amount of the aggregating liquid with respect to the amount of the ink droplets discharged in correspondence to the first pixels becomes less than the percentage of the amount of the aggregating liquid with respect to the amount of the ink droplets discharged in correspondence to the second pixels.

6. The image forming apparatus of claim 5, further comprising a detecting means for detecting defective nozzles that cannot form proper dots among the plural nozzles of the recording head, wherein the classifying means classifies the pixels of the image data into the first pixels and the second pixels on the basis of the detection result of the detecting means.

7. An image forming method that records an image corresponding to image data with a recording head that record dots corresponding to pixels of the image data by discharging ink droplets from plural nozzles and discharge, in correspondence to the dots, colorless or light-colored aggregating liquid that causes color material in the ink to aggregate, the method comprising the steps of:

storing an image data conversion rule for converting the image data per pixel in accordance with the percentage of the amount of the aggregating liquid with respect to the amount of the discharge ink droplets that record the dots, with the image data conversion rule being determined so that differences in one or both of color and concentration when discharging different amounts of the aggregating liquid onto the dots recorded on the basis of the image data after conversion in accordance with the image data conversion rule become smaller with respect to differences in one or both of color and concentration when discharging different amounts of the aggregating liquid onto the dots recorded on the basis of the image data prior to conversion;

setting the percentage of the amount of the aggregating liquid with respect to the amount of the ink droplets discharged in correspondence to the pixels of the image data;

converting the image data on the basis of the image data conversion rule corresponding to the set percentage of the amount of the aggregating liquid; and controlling the recording head to record dots in accordance with the converted image data and controlling the recording head to discharge, in correspondence to the dots, the aggregating liquid of which amount corresponds to the amount of the aggregating liquid of the percentage set in the setting step.

8. A storage medium storing an image forming program executed in a computer that controls a recording head that record dots corresponding to pixels of image data by discharging ink droplets from plural nozzles and discharge, in correspondence to the dots, colorless or light-colored aggregating liquid that causes color material in the ink to aggregate, the program comprising the steps of:

storing an image data conversion rule for converting the image data per pixel in accordance with the percentage of the amount of the aggregating liquid with respect to the amount of the discharge ink droplets that record the dots, with the image data conversion rule being determined so that differences in one or both of color and concentration when discharging different amounts of the aggregating liquid onto the dots recorded on the basis of the image data after conversion in accordance with the image data conversion rule become smaller with respect to differences in one or both of color and concentration when discharging different amounts of the aggregating liquid onto the dots recorded on the basis of the image data prior to conversion;

setting the percentage of the amount of the aggregating liquid with respect to the amount of the ink droplets discharged in correspondence to the pixels of the image data;

converting the image data on the basis of the image data conversion rule corresponding to the set percentage of the amount of the aggregating liquid; and controlling the recording head to record dots in accordance with the converted image data and controlling the recording head to discharge, in correspondence to the dots, the aggregating liquid of which amount corresponds to the amount of the aggregating liquid of the percentage set in the setting step.

9. An image forming apparatus comprising:

a recording head that record dots corresponding to pixels of image data by discharging ink droplets from plural nozzles and discharge, in correspondence to the dots, colorless or light-colored aggregating liquid that causes color material in the ink to aggregate;

a storage means that stores an image data conversion rule for converting the image data per pixel in accordance with the percentage of the amount of the aggregating liquid with respect to the amount of the discharge ink droplets that record the dots, with the image data conversion rule being determined so that differences in at least one brightness, color saturation and color hue when discharging different amounts of the aggregating liquid onto the dots recorded on the basis of the image data after conversion in accordance with the image data conversion rule become smaller with respect to differences in at least one of brightness, color saturation and color hue when discharging different amounts of the aggregating liquid onto the dots recorded on the basis of the image data prior to conversion;

a setting means that sets the percentage of the amount of the aggregating liquid with respect to the amount of the ink droplets discharged in correspondence to the pixels of the image data;

a converting means that converts the image data on the basis of the image data conversion rule corresponding to the percentage of the amount of the aggregating liquid set by the setting means; and a control means that controls the recording head to record dots in accordance with the image data converted by the converting means and controls the recording head to discharge, in correspondence to the dots, the aggregating liquid of which amount corresponds to the amount of the aggregating liquid of the percentage set by the setting means.

10. The image forming apparatus of claim 9, further comprising a classifying means that classifies the pixels of the image data into first pixels recorded by defective nozzles that cannot form proper dots and defect-vicinity nozzles in the vicinity of the defective nozzles and second pixels recorded by normal nozzles outside the defective nozzles and the defect-vicinity nozzles, wherein the setting means sets the percentage of the amount of the aggregating liquid so that the percentage of the amount of the aggregating liquid with respect to the amount of the ink droplets discharged in correspondence to the first pixels becomes less than the percentage of the amount of the aggregating liquid with respect to the amount of the ink droplets discharged in correspondence to the second pixels.

11. The image forming apparatus of claim 10, further comprising a detecting means for detecting defective nozzles that cannot form proper dots among the plural nozzles of the recording head, wherein the classifying means classifies the pixels of the image data into the first pixels and the second pixels on the basis of the detection result of the detecting means.

12. An image forming method that records an image corresponding to image data with a recording head that record dots corresponding to pixels of the image data by discharging ink droplets from plural nozzles and discharge, in correspondence to the dots, colorless or light-colored aggregating liquid that causes color material in the ink to aggregate, the method comprising the steps of:

storing an image data conversion rule for converting the image data per pixel in accordance with the percentage of the amount of the aggregating liquid with respect to the amount of the discharge ink droplets that record the dots, with the image data conversion rule being determined so that differences in at least one brightness, color saturation and color hue when discharging different amounts of the aggregating liquid onto the dots recorded on the basis of the image data after conversion in accordance with the image data conversion rule become smaller with respect to differences in at least one of brightness, color saturation and color hue when discharging different amounts of the aggregating liquid onto the dots recorded on the basis of the image data prior to conversion;

setting the percentage of the amount of the aggregating liquid with respect to the amount of the ink droplets discharged in correspondence to the pixels of the image data;

converting the image data on the basis of the image data conversion rule corresponding to the set percentage of the amount of the aggregating liquid; and controlling the recording head to record dots in accordance with the converted image data and controlling the recording head to discharge, in correspondence to the dots, the aggregating liquid of which amount corresponds to the amount of the aggregating liquid of the percentage set in the setting step.

* * * * *